(12) United States Patent
Velasco et al.

(10) Patent No.: US 9,929,877 B2
(45) Date of Patent: Mar. 27, 2018

(54) SYSTEMS, DEVICES, AND METHODS FOR GENERATING A SUBSTANTIALLY CONTINUOUS STREAM OF AUDIOVISUAL DATA DURING A SWITCHING EVENT

(71) Applicant: Crestron Electronics, Inc., Rockleigh, NJ (US)

(72) Inventors: Adolfo Velasco, Dumont, NJ (US); Justin Kennington, Magnolia, TX (US); Christopher Merck, Hoboken, NJ (US); Gennady Pratusevich, West Nyack, NY (US)

(73) Assignee: CRESTRON ELECTRONICS, INC., Rockleigh, NJ (US)

( * ) Notice: Subject to any disclaimer, the term of this patent is extended or adjusted under 35 U.S.C. 154(b) by 10 days.

(21) Appl. No.: 15/272,787

(22) Filed: Sep. 22, 2016

(65) Prior Publication Data

US 2017/0012796 A1 Jan. 12, 2017

Related U.S. Application Data

(63) Continuation of application No. 14/500,938, filed on Sep. 29, 2014, now Pat. No. 9,456,236, which is a
(Continued)

(51) Int. Cl.
| | |
|---|---|
| *H04N 7/16* | (2011.01) |
| *H04L 12/28* | (2006.01) |
| *H04N 21/254* | (2011.01) |
| *H04N 21/434* | (2011.01) |
| *H04N 21/4363* | (2011.01) |
| *H04N 21/4367* | (2011.01) |
| *H04N 21/4402* | (2011.01) |

(Continued)

(52) U.S. Cl.
CPC ..... *H04L 12/2838* (2013.01); *H04N 21/2343* (2013.01); *H04N 21/2541* (2013.01); *H04N 21/4344* (2013.01); *H04N 21/4367* (2013.01); *H04N 21/4384* (2013.01); *H04N 21/43635* (2013.01); *H04N 21/4402* (2013.01); *H04N 21/4627* (2013.01); *H04L 2012/2849* (2013.01)

(58) Field of Classification Search
CPC combination set(s) only.
See application file for complete search history.

(56) References Cited

U.S. PATENT DOCUMENTS

| | | |
|---|---|---|
| 5,757,414 A | 5/1998 | Thorne |
| 7,643,731 B2 | 1/2010 | Kobayashi et al. |

(Continued)

OTHER PUBLICATIONS

Nov. 15, 2013 First NFOA U.S. Appl. No. 13/764,315.
(Continued)

*Primary Examiner* — Alexander Gee
(74) *Attorney, Agent, or Firm* — Crestron Electronics, Inc

(57) ABSTRACT

When switching sources, resolutions or refresh rates in a video distribution network, switching times are reduced by maintaining video lock and security authentication between a video switcher and a video sink. The scaler maintains video lock and security authentication by continuing to generate video timing data during switching events. The scaler also facilitates an aesthetically pleasing transition by generating image content data prior to and after the switching event.

24 Claims, 12 Drawing Sheets

Related U.S. Application Data continuation-in-part of application No. 13/764,315, filed on Feb. 11, 2013, now Pat. No. 9,516,362.

(60) Provisional application No. 61/883,719, filed on Sep. 27, 2013, provisional application No. 61/597,448, filed on Feb. 10, 2012.

(51) Int. Cl.
  *H04N 21/2343* (2011.01)
  *H04N 21/438* (2011.01)
  *H04N 21/4627* (2011.01)

(56) References Cited

U.S. PATENT DOCUMENTS

| | | | |
|---|---|---|---|
| 7,702,925 B2 | 1/2010 | Northcutt et al. | |
| 7,796,194 B2 | 9/2010 | Hall | |
| 7,893,941 B2* | 2/2011 | Day | G06F 3/1423 345/520 |
| 8,321,905 B1* | 11/2012 | Streeter | H04N 21/4384 709/231 |
| 9,456,236 B2 | 9/2016 | Velasco et al. | |
| 2006/0140211 A1 | 6/2006 | Huan et al. | |
| 2009/0138935 A1* | 5/2009 | Ohkita | G09G 5/006 725/134 |
| 2010/0138889 A1* | 6/2010 | Subramanian | H04N 21/4331 725/118 |
| 2011/0134330 A1 | 6/2011 | Yu et al. | |
| 2011/0150215 A1* | 6/2011 | Domingo | H04N 7/1675 380/200 |
| 2011/0150216 A1 | 6/2011 | Barry | |
| 2011/0176056 A1* | 7/2011 | Toba | H04N 21/4104 348/552 |
| 2011/0197073 A1 | 8/2011 | Taraci | |
| 2012/0147267 A1* | 6/2012 | Ryan | H04N 5/06 348/521 |
| 2013/0103822 A1* | 4/2013 | Wolcott | H04L 41/12 709/224 |
| 2014/0153904 A1* | 6/2014 | Adimatyam | H04N 5/76 386/248 |

OTHER PUBLICATIONS

Feb. 18, 2014 Response to First NFOA U.S. Appl. No. 13/764,315.
May 7, 2014 FOA U.S. Appl. No. 13/764,315.
Sep. 8, 2014 After Final Response to FOA U.S. Appl. No. 13/764,315.
Oct. 10, 2014 Second NFOA U.S. Appl. No. 13/764,315.
Feb. 6, 2015 Response to Second NFOA U.S. Appl. No. 13/764,315.
Apr. 30, 2015 Third NFOA U.S. Appl. No. 13/764,315.
Oct. 30, 2015 Response to Third NFOA U.S. Appl. No. 13/764,315.
Dec. 16, 2015 Second FOA U.S. Appl. No. 13/764,315.
Jun. 16, 2016 RCE with Amendment U.S. Appl. No. 13/764,315.
Jul. 5, 2016 Third FOA U.S. Appl. No. 13/764,315.
Aug. 23, 2016 After Final Response to Third FOA U.S. Appl. No. 13/764,315.
Aug. 26, 2016 Supplemental After-Final Response to Third FOA U.S. Appl. No. 13/764,315.
May 8, 2015 First NFOA U.S. Appl. No. 14/500,938.
Nov. 6, 2015 Response to NFOA U.S. Appl. No. 14/500,938.
Dec. 21, 2015 Second NFOA U.S. Appl. No. 14/500,938.
Jun. 21, 2016 Response to Second NFOA U.S. Appl. No. 14/500,938.
Jul. 5, 2016 Supplemental Response to Second NFOA U.S. Appl. No. 14/500,938.
Jul. 27, 2016 Notice of Allowance U.S. Appl. No. 14/500,938.

\* cited by examiner

SYSTEMS, DEVICES, AND METHODS FOR GENERATING A SUBSTANTIALLY CONTINUOUS STREAM OF AUDIOVISUAL DATA DURING A SWITCHING EVENT

PRIORITY INFORMATION

The present application claims priority under 35 U.S.C. § 120 as a Continuation Patent Application to U.S. Non-Provisional patent application Ser. No. 14/500,938, filed 29 Sep. 2014, which claims priority to U.S. Provisional Patent Application Ser. No. 61/883,719, under 35 U.S.C. § 119(e), filed 27 Sep. 2013, and which also claims priority under 35 U.S.C. § 120 as a Continuation-in-Part Patent Application to U.S. Non-provisional patent application Ser. No. 13/764,315, filed 11 Feb. 2013, which claims priority under 35 U.S.C. § 119(e) as a Non-provisional Patent Application to U.S. Provisional Patent Application Ser. No. 61/597,448, filed 10 Feb. 2012, the entire contents of all of which are expressly incorporated herein by reference, and is further related to U.S. Non-provisional patent application Ser. No. 15/272,810, entitled "Systems, Devices, and Methods for Maintaining a Secure Audiovisual Data Link with an Audiovisual Sink During a Switching Event," the entire contents of which are incorporated herein by reference.

BACKGROUND

Technical Field

Aspects of the embodiments relate generally to video distribution networks. More particularly, aspects of the embodiments are directed to systems, methods, and modes for distributing video protected by a digital rights management scheme.

Background Art

Video distribution networks are increasingly common installations in commercial and residential facilities. Components of a video distribution network are typically located throughout the facility and networked allowing video to be distributed from one or more video source to one or more video sinks. For example, a typical video distribution network in a home may comprise a multitude of video sources, such as Blu-Ray disc players, media servers, DVD players, digital video recorders (DVR), and cable boxes. These video sources may be centrally located such as in an equipment rack in a closet and distributed via a chain of switches and repeaters to various video sinks, such as television displays, computer monitors and projectors, throughout the home.

However, as the digital distribution of television, movies, and music expands, content providers are growing increasingly concerned about the simplicity with which content pirates can copy and share copyrighted material. Various digital rights management (DRM) schemes have been developed to ensure that television shows, movies and music can only be viewed or heard by authorized parties (i.e. paying customers). One DRM scheme to protect digital content as it is transmitted over cables between devices is known as High-Bandwidth Digital Content Protection (HDCP). HDCP is a specified method developed by Digital Content Protection, L.L.C. (DCP) for protecting copyrighted digital content as it travels across connection interfaces and protocols such as DisplayPort (DP), Digital Video Interface (DVI), High-Definition Multimedia Interface (HDMI). The HDMI specification defines an interface for carrying digital audiovisual content from a source such as a Blu-Ray Disc player, to a sink or display device such as a television (TV).

There are three facets to HDCP. First, there is the authentication protocol, through which a source verifies that a given sink is licensed to receive HDCP content. With the legitimacy of the sink determined, encrypted HDCP content may be transmitted between the two devices, based on shared secrets established during the authentication protocol. The use of such shared secrets prevents eavesdropping devices from utilizing the content. Finally, in the event that legitimate devices are compromised to permit unauthorized use of HDCP content, renewability allows a source to identify such compromised devices and prevent the transmission of HDCP content.

The HDCP authentication protocol is an exchange between an HDCP compliant source and an HDCP compliant sink that affirms to the source that the sink is authorized to receive HDCP content by demonstrating knowledge of a set of secret device keys by transmitting a key selection vector (KSV). Each HDCP device is provided with a unique set of these secret device keys, referred to as the device private keys (DPKs), from DCP. The communication exchange also provides for both the HDCP compliant source and sink to generate a shared secret value that cannot be determined by eavesdropping on that exchange. By having that shared secret information embedded into the demonstration of authorization, the shared secret can then be used as a symmetric key to encrypt HDCP content intended only for the authorized device. Thus, a communication path is established between the HDCP source and HDCP sink that only authorized devices can access.

In order for an HDCP compliant source to successfully transmit protected content to one or more HDCP compliant sinks through an HDCP compliant repeater, a more involved authentication process must first occur. To affirm the downstream sinks to the upstream sources, the HDCP repeater must pass along the KSVs of each downstream receiver to the upstream source. The HDCP source checks these KSVs against an HDCP Revocation List maintained by DCP, LLC ("HDCP blacklist") in order to determine if each of the downstream sinks are licensed to receive the protected content. If all the downstream sinks are determined to be licensed to receive the protected content, the upstream source transmits the protected content to the HDCP repeater. It is the responsibility of the HDCP repeater to then establish and periodically manage authenticated links with each of its connected HDCP receivers.

While HDCP offers the benefit of encrypted content transmission, the required authentication protocol increases the switching delay in video distribution networks. Each time a new path for video distribution is desired, the links forming those paths must be authenticated. For example, when a user desires to switch to a different video source, not only must the new video source authenticate with the repeater, but the repeater must also re-authenticate with the video sink. Increased switching times are disrupting and bothersome to users. In complex video distribution systems with multiple layers, this problem is even more amplified. Additionally, because HDCP scheme operates under the surface, most users do not realize that the increased time is the result of copy protection schemes and often unfairly attribute them to the individual components in the video distribution network.

An additional factor in the high switching delay in video distribution units, is caused by the need for processing in video distribution networks. Scalers are employed to change the resolution or refresh rate of distributed video and are common components in video distribution networks, either as separate components or integrated into other components in the network. Each time a video scaler receives audiovisual data at a new resolution, there is a delay before the scaler outputs any new video. The video scaler must load data and format before outputting scaled video. This is known as achieving video lock. During a switching event, each scaler in the distribution path must achieve video lock in succession. In complex video distribution systems with multiple layers, this delay is amplified.

Additionally, dependent on the characteristics of the display, viewers may be subjected to disrupting video artifacts or snow during switches. Manufacturers handle disrupted video in different ways. Some displays may show snow when video is disrupted. Other may display pixilated images or ghost images. Many viewers find these display responses disturbing and lead some to believe that there is a problem with their equipment when no such problem exists. Users may experience the authentication process as a delayed period with snow or disorienting video artifacts.

There is now a need for an improved switcher for use in a video distribution network. Accordingly, it would be desirable to provide methods, modes, and systems for distributing video protected by a digital rights management scheme.

SUMMARY

An object of the embodiments is to substantially solve at least the problems and/or disadvantages discussed above, and to provide at least one or more of the advantages described below.

It is therefore a general aspect of the embodiments to provide systems, methods, and modes for programming a control network and more specifically for programming a control network comprising one or more lighting, shade, and other types of controllable devices that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

Aspects of the embodiments seek to overcome or at least ameliorate one or more of the several problems described above, including but not limited to: reducing the switching delay of a video distribution network transmitting video.

According to a first aspect of the embodiment, a device and method are provided for reducing the actual and perceived switching time of a video distribution network by outputting a continuous stream of audiovisual data including a repeated frame of image content data on a downstream connection of a switcher device.

According to a second aspect of the embodiments, a switcher device comprises at least two input boards, a multiplexer and an output board. Each of the at least two input boards are configured for receiving audiovisual data from a video source. The multiplexer is communicatively coupled between the at least two input boards and a transmitter board and configured for dynamically routing audiovisual data from the at least input boards to the transmitter board. The output board is configured for transmitting audiovisual data comprising a repeated frame of video to a video sink.

According to a third aspect of the embodiments, a switcher device comprises at least two input boards, a multiplexer board and an output board. Each of the at least two input boards is configured for receiving audiovisual data from a video source. The multiplexer board comprises a multiplexer communicatively coupled between the at least two input boards and an output board and configured for dynamically routing audiovisual data from the at least two input boards to the output board and a processing unit in communication with the multiplexer and the output board and configured for transmitting a switch signal to the multiplexer and a prepare signal to the transmitter board prior to a switching event. The output board is configured for transmitting audiovisual data to a video sink and comprises a receiver configured for receiving audiovisual data routed from the multiplexer, a scaler configured for converting audiovisual data received via the multiplexer to video to a native resolution of the video sink, generating video timing data at the native resolution of the video sink during the switching event and generating image content data comprising a repeated frame of video for a period of time until achieving video lock in response to receiving the prepare signal, and a transmitter configured for encrypting and transmitting generated audiovisual data to the video sink.

According to a fourth aspect of the embodiments, an output board for a switcher device is adapted to transmit audiovisual data to a video sink. The output board comprises a receiver, a scaler and a transmitter. The receiver is configured for receiving audiovisual data. The scaler is adapted to convert the audiovisual data to a native resolution of the video sink and adapted to generate audiovisual data comprising a repeated frame during a switching event. The transmitter is further adapted to encrypt and transmit the output of the scaler.

According to a fifth aspect of the embodiments, a method is provided for reducing switching delay when switching sources in a video distribution network. The method comprises the steps of receiving audiovisual data at a first input board from a first video sink, routing audiovisual data from the first input board to an output board, transmitting audiovisual data from the output board to a video sink, receiving a user control signal to switch to a second video source, generating video timing data at the output board during a delay between receiving audiovisual data from the first input board and receiving audiovisual data from the second input board to maintain authenticity of security protocol link between the output board and the video sink, generating image content data at the output board during a delay between receiving audiovisual data from the first input board and achieving video lock with audiovisual data from the second input board, receiving audiovisual data at a second input board from a second video sink, routing audiovisual data from the second input board to the output board, and transmitting audiovisual data from the output board to the video sink.

According to a sixth aspect of the embodiments, a computer program product is provided for reducing the switching time in a video distribution network, the computer program product comprising a computer readable storage medium having computer readable code embodied there-with. The computer readable program code comprises computer readable program code adapted to detect a user control signal to switch from a first video source to a second video source, transmit a prepare signal to a processing unit of an output board in response to the detection of the user control signal, detect the prepare signal, instruct a scaler to generate audiovisual data comprising image content data further comprising a repeated frame of video in response to the detection of the prepare signal, cease routing audiovisual data from a first video source to the output board, continue generating video timing data at the scaler of the output board, begin routing audiovisual data from a second video source to the input board, and cease generating image content data upon achieving video lock.

According to a seventh aspect of the embodiments, a switcher device is provided, comprising: at least one output board; at least two input boards, each of the at least two input boards adapted to receive audiovisual data from a respective audiovisual source via a respective audiovisual link; a multiplexer communicatively coupled between the at least two input boards and the at least one output board, and adapted to dynamically switch audiovisual data from the at least two input boards to the at least one output board; and a switcher device processing unit adapted to notify the at least one output board that it will receive an output from the multiplexer a predetermined amount of time prior to transmitting a switch signal to the multiplexer for a switching event.

According to the seventh aspect of the embodiments, the switching event comprises: a switch from receiving audiovisual data from a first audiovisual source to receiving audiovisual data from a second audiovisual source.

According to the seventh aspect of the embodiments, the switching event comprises: a switch from receiving audiovisual data at a first resolution to receiving audiovisual data at a second resolution.

According to the seventh aspect of the embodiments, the switching event comprises: a switch from receiving audiovisual data at a first refresh rate to receiving audiovisual data at a second refresh rate.

According to the seventh aspect of the embodiments, the at least one output board comprises: an output board processing unit, and wherein the switcher device processing unit is further adapted to transmit a prepare signal to the output board processing unit a predetermined amount of time before transmitting a switch signal to the multiplexer for the switching event.

According to the seventh aspect of the embodiments, the prepare signal comprises: a network address of the at least output board.

According to the seventh aspect of the embodiments, the prepare signal is transmitted as a user datagram protocol packet.

According to the seventh aspect of the embodiments, the at least one output board is adapted to (i) transmit audiovisual data to an audiovisual sink via an audiovisual link, (ii) generate audiovisual data comprising a repeated frame of image content data, and (iii) output a substantially continuous stream of audiovisual data during the switching event, the audiovisual data comprising the repeated frame of image content data, and wherein the at least one output board further comprises a scaler adapted to generate the repeated frame of image content data during the switching event, and wherein the at least one output board is adapted to transmit audiovisual data to the audiovisual sink via a security protocol link, and is further adapted to maintain the security protocol link as an authenticated interface by generating a continuous stream of video timing data during the switching event.

According to the seventh aspect of the embodiments, the scaler is further adapted to substantially continuously output the repeated frame of image content data until receiving a sufficient amount of audiovisual data after the switching event to achieve video lock.

According to the seventh aspect of the embodiments, the scaler is further adapted to determine the native resolution of the audiovisual sink from Extended Display Identification Data (EDID) information of the audiovisual sink.

According to the seventh aspect of the embodiments, the security protocol link is a High-bandwidth Digital Content Protection (HDCP) link.

According to the seventh aspect of the embodiments, the scaler is further adapted to generate the substantially continuous stream of video timing data at a native resolution of the audiovisual sink.

According to an eighth aspect of the embodiments, a video distribution network is provided comprising: at least two audiovisual sources; at least one output board; a multiplexer communicatively coupled to both the at least two audiovisual sources and the at least one output board; and a switcher adapted to dynamically route audiovisual data from the at least two audiovisual sources to the at least one output board through the multiplexer, and is further adapted to notify the at least one output board that it will receive an output from the multiplexer a predetermined amount of time prior to transmitting a switch signal to the multiplexer for a switching event.

According to the eighth aspect of the embodiments, the switching event can be one of a switch from receiving audiovisual data from a first audiovisual source to receiving audiovisual data from a second audiovisual source, a switch from receiving audiovisual data at a first resolution to receiving audiovisual data at a second resolution, and a switch from receiving audiovisual data at a first refresh rate to receiving audiovisual data at a second refresh rate.

According to the eighth aspect of the embodiments, the switcher comprises a switcher device processing unit, and the at least one output board comprises an output board processing unit, and wherein the switcher device processing unit is adapted to be communicatively coupled with the multiplexer and the output device processing unit, and the switcher device processing unit is further adapted to transmit a prepare signal to the at least one output board processing unit a predetermined amount of time before transmitting a switch signal to the multiplexer for the switching event.

According to the eighth aspect of the embodiments, the prepare signal comprises: a network address of the at least one output board.

According to the eighth aspect of the embodiments, the switcher device processing unit and the output device processing unit are communicatively coupled via an Ethernet interface.

According to the eighth aspect of the embodiments, the prepare signal is transmitted as a user datagram protocol packet.

According to the eighth aspect of the embodiments, the video distribution network further comprises: at least one audiovisual sink, and wherein the at least one output board is adapted to—be communicatively coupled to the at least one audiovisual sink, transmit audiovisual data to the at least one audiovisual sink via an audiovisual link, receive the notification from the switcher, generate audiovisual data comprising a repeated frame of image content data in response to the notification, and output a substantially continuous stream of audiovisual data during the switching event, the audiovisual data comprising the repeated frame of image content data.

According to the eighth aspect of the embodiments, the at least one output board comprises: a scaler adapted to generate the repeated frame of image content data during the switching event, and wherein the at least one output board is further adapted to transmit audiovisual data to the at least one audiovisual sink via a security protocol link, and is further adapted to maintain the security protocol link as an authenticated interface by generating a substantially continuous stream of video timing data during the switching event.

According to the eighth aspect of the embodiments, the switcher is further adapted to determine a network topology of the video distribution network.

According to a ninth aspect of the embodiments, an output board in a switcher device for transmitting audiovisual data to a video sink is provided, the output board comprising: an output board processing unit; and a scaler adapted to generate video timing data at a native resolution of the video sink and a repeated frame of image content data during a switching event, wherein the switcher device comprises a switcher device processing unit, and a multiplexer, and wherein (a) the switcher device processing unit is communicatively coupled with the multiplexer and the output board processing unit, and (b) the switcher device processing unit is adapted to notify the output board processing unit that it the output board will receive an output from the multiplexer a predetermined amount of time prior to transmitting a switch signal the multiplexer for the switching event.

According to the ninth aspect of the embodiments, the switcher device processing unit is adapted to transmit a prepare signal to the output board processing unit a predetermined amount of time before transmitting a switch signal to the multiplexer for the switching event.

According to the ninth aspect of the embodiments, the output board is further adapted to transmit audiovisual data to the video sink via a security protocol link and is further adapted to maintain the security protocol link as an authenticated interface by generating a continuous stream of video timing data during the switching event.

According to the ninth aspect of the embodiments, the switching event is a switch from receiving audiovisual data at a first resolution to receiving audiovisual data at a second resolution.

According to the ninth aspect of the embodiments, the switching event is a switch from receiving audiovisual data from a first source to receiving audiovisual data from a second source According to the ninth aspect of the embodiments, the switching event is a switch from receiving audiovisual data at a first refresh rate to receiving audiovisual data at a second refresh rate.

According to the ninth aspect of the embodiments, the scaler is adapted for continuing to output the repeated frame of image content data until receiving a sufficient amount of audiovisual data after the switching event to achieve video lock.

According to the ninth aspect of the embodiments, the scaler determines a native resolution of the video sink from Extended Display Identification Data (EDID) information of the video sink.

According to a tenth aspect of the embodiments, a method for switching audiovisual sources in a video distribution network is provided, the method comprising: (a) receiving first audiovisual data at a switching device; (b) transmitting the received first audiovisual data from the switching device to at least one audiovisual data sink; (c) receiving second audiovisual data during a switching event; (d) transmitting the switched second audiovisual data to the at least one audiovisual data sink; and (e) generating a notification signal a predetermined amount of time prior to the step of outputting the switched second audiovisual data.

According to the tenth aspect of the embodiments, the steps of receiving first and second audiovisual data comprise: transmitting the first and second audiovisual data from an audiovisual source; receiving the transmitted first and second audiovisual data at an input board in the switching device; transmitting the received first and second audiovisual data from the input board; and receiving the transmitted first and second audiovisual data from the input board at a multiplexer in the switching device.

According to the tenth aspect of the embodiments, the switching event comprises: a switch from receiving audiovisual data from a first audiovisual source to receiving audiovisual data from a second audiovisual source.

According to the tenth aspect of the embodiments, the switching event comprises: a switch from receiving audiovisual data at a first resolution to receiving audiovisual data at a second resolution.

According to the tenth aspect of the embodiments, the switching event comprises: a switch from receiving audiovisual data at a first refresh rate to receiving audiovisual data at a second refresh rate.

According to the tenth aspect of the embodiments, the steps of outputting first and second audiovisual data comprises: outputting the first and second audiovisual data from the multiplexer to an output board; and outputting the first and second audiovisual data from the output board to an audiovisual sink.

According to the tenth aspect of the embodiments, the method further comprises: determining that an audiovisual switching event will occur; transmitting a switch signal to the multiplexer; and notifying the output board that it will receive an output from the multiplexer a predetermined amount of time prior to transmitting the switch signal to the multiplexer for the switching event.

According to the tenth aspect of the embodiments, the step of notifying comprises: receiving a control signal at a switcher device processing unit that indicates a switching event from the first audiovisual data to the second audiovisual data; and transmitting a prepare signal to the output board from the switcher device processing unit prior to switching from the first audiovisual data to the second audiovisual data.

According to the tenth aspect of the embodiments, the method further comprises: in response to receipt of the prepare signal, generating audiovisual data by a scalar in the output board comprising a repeated frame of image content data during the delay between receiving the first audiovisual data and receiving the second audiovisual data.

According to the tenth aspect of the embodiments, the repeated frame of image content data comprises: image content data from the first audiovisual data.

According to the tenth aspect of the embodiments, the method further comprises: transmitting the audiovisual data to the audiovisual sink by the output board using a security protocol link, and maintaining the security protocol link as an authenticated interface by generating a continuous stream of video timing data during the switching event.

According to the tenth aspect of the embodiments, the prepare signal comprises: a network address of the output board.

According to the tenth aspect of the embodiments, the method further comprises: determining a video distribution network topology.

According to the tenth aspect of the embodiments, the method further comprises: determining a network path to the output device.

According to the tenth aspect of the embodiments, the method further comprises: scaling audiovisual data at the output device to a native resolution of the display.

According to the tenth aspect of the embodiments, the method further comprises: continuing to generate audiovisual data at the output device until an amount of audiovisual data sufficient to achieve video lock is received from the second audiovisual source.

BRIEF DESCRIPTION OF DRAWINGS

The accompanying figures further illustrate aspects of the embodiments.

The above and other objects and features of the embodiments will become apparent and more readily appreciated from the following description of the embodiments with reference to the following figures, wherein like reference numerals refer to like parts throughout the various figures unless otherwise specified.

DETAILED DESCRIPTION

Figure 1:
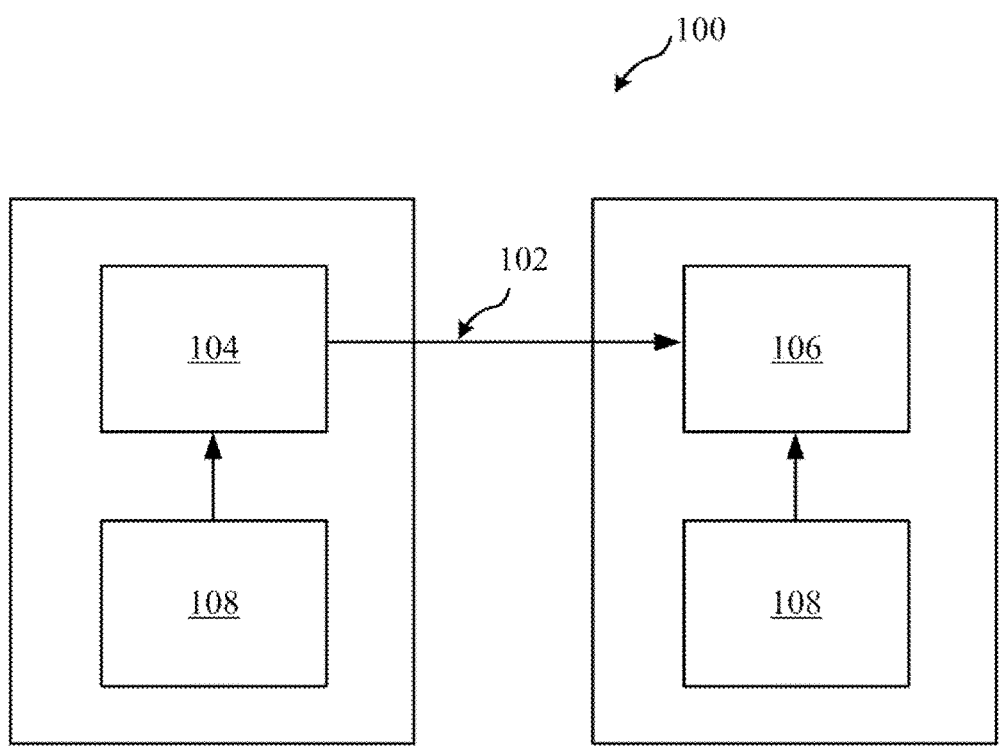
FIG. 1 is a block diagram of a high-bandwidth digital content protection (HDCP) system.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments can, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics can be combined in any suitable manner in one or more embodiments.

LIST OF REFERENCE NUMBERS FOR THE MAJOR ELEMENTS IN THE DRAWING

The following is a list of the major elements in the drawings in numerical order.

| | |
|---|---|
| 100 | High-Bandwidth Digital Content Protection (HDCP) System |
| 102 | Interface Cable or Link |
| 104 | Audiovisual (A/V) Source |
| 106 | A/V Sink/Display |
| 108 | Secret Device Keys |
| 200 | High Bandwidth Digital Content Protection System |
| 202 | HDCP Content (Audiovisual Data) |
| 210 | Control Function |
| 212, 215 | HDCP Transmitter |
| 214, 216 | HDCP Receiver |
| 219 | Repeater |
| 220 | Central Processing Unit (CPU) |
| 300 | Video Distribution Network |
| 302 | Switcher Device |
| 304 | Control Signal |
| 306 | Multiplexer |
| 308 | Input Board |
| 310 | Output Board |
| 316 | User Control Signal |
| 318 | Switcher Processing Unit |
| 320 | Transceiver |
| 322 | Control System |
| 323 | User Interface Device (Wireless/Mobile Device) |
| 324 | User Interface Device |
| 401 | Receiver |
| 402 | Output Scaler |
| 403 | Output Processing Unit |
| 502 | Interface Cable (Link) |
| 508 | Extended Reception Board |
| 510 | Extended Transmission Board |
| 601 | Receiver |
| 615 | HDCP Transmitter |
| 700 | Method for Reducing the Switching Time in a Video Distribution Network |
| 701-715 | Steps of Method 700 |
| 900 | Method for Reducing the Switching Time in a Video Distribution Network |
| 901-915 | Steps of Method 900 |
| 1100 | Method for Reducing the Switching Time in a Video Distribution Network |
| 1101-1116 | Steps of Method 1100 |
| 1201 | Input Audiovisual Data |
| 1202 | Frame Rate Processing Block |
| 1204 | Memory |
| 1205 | Output Audiovisual Data |
| 1206 | Input Scaling Block |
| 1208 | Output Scaling Block |
| 1210 | Free-Running Output Timing Generator |
| 1211 | Output Video Timing Data |

LIST OF ACRONYMS IN THE SPECIFICATION

The following is a list of the acronyms used in the specification in alphabetical order.

| | |
|---|---|
| A/V | Audiovisual |
| API | Application Programming Interface |
| ASIC | Application Specific Integrated Circuit |
| CAT5e | Category 5 Enhanced |
| CD | Compact Disk |
| CPU | Central Processing Unit |
| DC | Direct Current |
| DCP | Digital Content Protection, LLC |
| DDC | Display Data Channel |
| DDWG | Digital Display Working Group |
| DM | DigitalMedia |
| DP | DisplayPort Protocol |
| DPDT | Double Pole Double Throw |
| DPK | Device Private Keys |
| DPST | Double Pole Single Throw |
| DRM | Digital Rights Management |
| DVD | Digital Video Disc |
| DVD | Digital Versatile Disk |
| DVI | Digital Video Interface |
| DVR | Digital Video Recorder |
| EDID | Extended Display Data Channel |
| FPGA | Field Programmable Gate Array |
| HDCP | High-Bandwidth Definition Content Protection |
| HDMI | High Definition Multimedia Interface |
| HPD | Hot Plug Detection |
| KSV | Key Selection Vector |
| LCD | Light Commanding Diode |
| PCB | Printed Circuit Board |
| RAM | Random Access Memory |
| ROM | Read Only Memory |
| SDK | Software Development Kit |
| SPDT | Single Pole Double Throw |
| SPIF | Serial Peripheral Interface |
| SPST | Single Pole Single Throw |
| STP | Shielded Twisted Pair |
| TMDS | Transition Minimized Differential Signaling |
| TV | Television |
| UDP | User Datagram Protocol |
| UTP | Unshielded Twisted Pair |

LIST OF DEFINITIONS

Authorized device—An HDCP device that is permitted access to HDCP content. An HDCP transmitter may test if an attached HDCP receiver is an authorized device by successfully completing the first and, when applicable, second part of the authentication protocol. If the authentication protocol successfully results in establishing authentication, then the other device is considered by the HDCP transmitter to be an authorized device.

Downstream—Term used as an adjective to refer to being towards the sink/display of the HDCP content stream.

DVI—Short for Digital Video (or Visual) Interface, a digital interface standard created by the Digital Display Working Group (DDWG) to accommodate both analog and digital monitors.

HDCP—short for High-Bandwidth Digital Content Protection, a specified method developed by Digital Content Protection, L.L.C. (DCP) for protecting copyrighted digital content as it travels across connection interfaces and protocols such as DisplayPort (DP), DVI, and HDMI, among others.

HDCP content—consists of audiovisual content that is protected by the HDCP system. HDCP content includes the audiovisual content in encrypted form as it is transferred from an HDCP transmitter to an HDCP receiver over an HDCP-protected Interface.

HDCP device—Any device that contains one or more HDCP-protected interface ports and is designed in adherence to HDCP.

HDCP Encryption—The encryption technology of HDCP when applied to the protection of HDCP content in an HDCP system.

HDCP-protected Interface—An interface for which HDCP applies.

HDCP-protected Interface Port—A connection point on an HDCP Device that supports an HDCP-protected Interface.

HDCP receiver—An HDCP device that can receive and decrypt HDCP content through one or more of its HDCP-protected interface ports.

HDCP repeater—An HDCP device that can receive and decrypt HDCP content through one or more of its HDCP-protected interface ports, and can also re-encrypt and emit the HDCP content through one or more of its HDCP-protected interface ports. An HDCP repeater may also be referred to as either an HDCP receiver or an HDCP transmitter when referring to either the upstream side or the downstream side, respectively.

HDCP transmitter—An HDCP device that can encrypt and emit HDCP content through one or more of its HDCP-protected interface ports.

HDMI—Short for High-Definition Multimedia Interface, an industry-supported, uncompressed, all-digital audio/video interface.

Upstream—Term used as an adjective to refer to being towards the source of the HDCP content stream. The antonym of "downstream," defined above.

Figure 2:
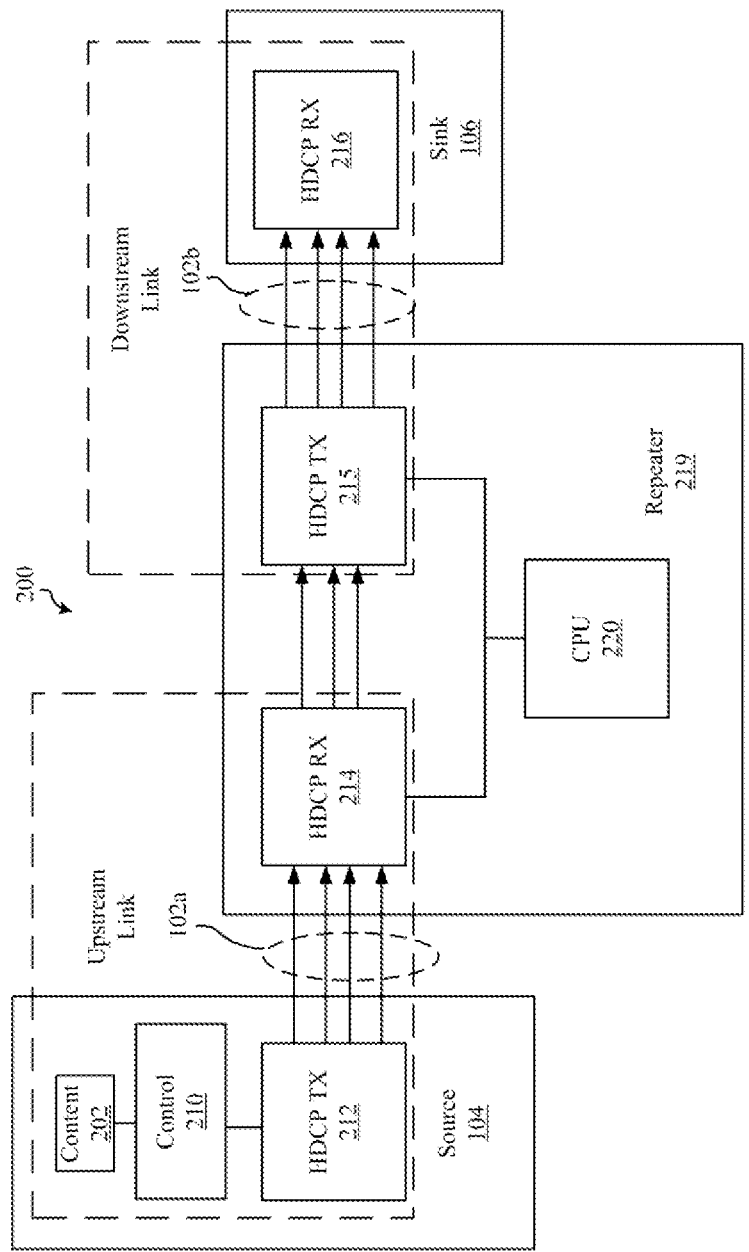
FIG. 2 is a block diagram of an HDCP system wherein two or more HDCP devices are interconnected through at least one HDCP-protected Interface.

FIGS. 1 and 2 illustrate examples of HDCP systems 100, 200. Referring to FIG. 1, the HDCP system 100 encrypts the digital content transmission between a video source 104 (set-top box, computer, DVD, etc.) and a sink or display 106 (liquid crystal display (LCD), television, etc.) via an interface 102 such as DVI, HDMI, and DP interfaces, among others.

FIG. 2 illustrates an HDCP system 200 wherein two or more HDCP devices 104, 106 are interconnected through an HDCP repeater and two HDCP-protected Interfaces 102a, 102b (collectively 102). Each point-to-point HDCP link involves one HDCP transmitter 212, and one HDCP receiver 214. As such, the HDCP repeater 219 must decrypt the HDCP content at the HDCP receiver 216 on each of its inputs. The repeater 219 must then re-encrypt the data with an HDCP transmitter 215 on each of its outputs. According to an aspect of the embodiments, repeater 219 must inform the upstream device of its downstream connection, and repeater 219 has the responsibility to maintain those connections. According to further aspects of the embodiments, repeater 219 can inform the upstream device of its downstream connector, and repeater 219 can maintain those connections. The audiovisual content protected by HDCP, HDCP content 202, flows from an upstream content control function 210 into the HDCP system 200 at the most upstream transmitter 212. From there, the HDCP content 202, encrypted by the HDCP system 200, flows through a tree-shaped topology of HDCP receivers 214 over HDCP-protected Interfaces 102. Before sending data, the each transmitter 212, 215 checks that the HDCP receivers 214, 216 are authorized to receive the HDCP content 202. If so, the transmitter 212 encrypts the HDCP content 202 to prevent eavesdropping as it flows to the receiver 216. A central processing unit 220 includes firmware to process the data 202 and other information and control.

Device manufacturers typically buy HDCP chips from a DCP-licensed silicon vendor. These chips usually also provides transition minimized differential signaling (TMDS) encoders or decoders and other HDMI-specific features. Every transmitter 212 will have at least one HDCP transmitter chip and every receiver 216 will have at least one HDCP receiver chip. The HDCP transmitters 212, and receivers 216, frequently require a microprocessor to implement the authentication state machines. Transmitters 212, 215 are HDMI transmitters.

Authentication and Encryption Protocols

HDCP authentication consists of three parts:

Part One: The source 104 authenticates with the sink/display 106 connected to its output. If successful, encryption is enabled and audiovisual (NV) content transmission begins.

Part Two: This part is used if the downstream device is a repeater 219. The repeater 219 authenticates with the devices connected to its output(s) and passes the HDCP tree topology information up to the source 104. The source 104 is the root and sinks/display 106 are the leaves, while repeaters 219 make up the branches of the tree.

Part Three: The source 104 performs periodic checks with the sink/display 106 to ensure that encryption is in sync. As mentioned above, it is the repeater's responsibility to maintain its downstream connections. If any part of authentication fails or any revoked devices are found in the HDCP tree, the transmitter 212 must stop sending protected content and authentication starts over at Part One.

Authentication Part One

Part One of authentication is a key exchange protocol. The transmitter 212 and receiver 216 calculate a common secret session key 108 to be used for encryption. If they cannot come up with the same key value, authentication fails and the receiver 216 will not be able to decrypt the content 202. The session key is derived from each device's private key according to the following protocol:

First, the transmitter 212 generates a random number "$A_n$," and sends it to the receiver 216. This value will be used later in the protocol. The devices 104, 106 then exchange KSVs. The receiver 216 also sends its REPEATER bit, a flag that indicates whether or not it is part of a repeater. Now each device 104, 106 has the other device's KSV. Each device 104, 106 uses the other device's KSV to select twenty of its own keys. The forty bits in the KSV correspond to the indexes of each of the forty private keys. For every set bit in the received KSV, the local private key at that index is selected. All KSVs have twenty set bits, so twenty keys are selected. The devices 104, 106 then each add up their selected keys to come up with the sums Km and Km', for the transmitter and receiver, respectively 212, 216. For authentication to succeed, Km and Km' must match. Each device 104, 106 tells the other which of its own unique, secret keys to select, and they both come up with the same sum. That may seem counter-intuitive, but it is the aforementioned mathematical relationship between the keys and the KSVs that accounts for this behavior. The source 104 must determine whether Km and Km' match. However, they are secret values, so they cannot be transmitted over the interface cable 102 for the DDC. Each device 104,106 feeds Km (or Km'), the random number "$A_n$", and the REPEATER bit into their respective HDCP cipher engines in order for the transmitter 212 to verify that the values match without sending them across the cable 213 for everyone to see. The resulting data stream is split into three values:

R0/R0': This return value may be shared between the devices 104, 106 and is used to verify that authentication was successful.

Ks/Ks': This value is kept private and is used as the encryption session key for the HDCP cipher.

M0/M: This value is also kept private and is used in Part Two of authentication (if the downstream device is a repeater 219).

The receiver sends R0' to the transmitter 212, which compares it against its' own R0 value. If they match, that proves that the sums Km and Km' matched, and authentication is successful. Furthermore, the session keys Ks and K match, so the receiver 214 will be able to decrypt the content encrypted by the transmitter. If Part One of authentication was successful, the transmitter 212 may begin sending encrypted content 202. If the downstream device is a repeater 219, the repeater 219 must authenticate with its own downstream device according to the same protocol. The transmitter 212 then starts a 5-second timer to allow for the repeater 219 to perform Part Two of authentication. If Part Two fails or times out, authentication fails and the transmitter 212 must stop transmitting the protected content 202.

Authentication Part Two

Part Two of authentication only occurs if the downstream device is a repeater 219. The purpose of Part Two is to inform the source 104 of all downstream devices and the HDCP tree depth. The source 104 uses this information to ensure that the tree topology maximums have not been exceeded and to ensure that none of the downstream devices have been revoked by DCP. The repeater 219 first assembles a list of the KSVs of all downstream devices, as well as the device count and the tree depth. The repeater 219 then passes this information up to the source 104. To ensure that this information hasn't been tampered with during transmission, each device takes this list, appends its secret value M0/M0' from Part One, and calculates a SHA-1 hash of the whole thing. The transmitter 212 reads the hash result from the receiver 214 and compares it against its own. If they match, Part Two of authentication is successful.

Authentication Part Three

All HDCP devices are considered authenticated after successful completion of Authentication Parts One and Two. Part Three is simply a link integrity check to ensure that encryption is in sync between all transmitter/receiver pairs 212, 214, 215, 216 in the tree. To support link integrity checks, the return values Ri and Ri' roll over to a new value every 128 frames. Recall that the initial Ri values R0 and R0' were generated during Part One of authentication. Every two seconds, the transmitter 212 compares the receiver's 216 Ri' value against its own Ri value to see if they match. If they don't, encryption is out of sync and the receiver 216 cannot correctly decrypt the content 202. The user will see a scrambled or "snowy" image on the screen. In this case the transmitter 212 must restart authentication from the beginning.

The three part authentication process increases switching delay when switching sources in a video distribution network. Switching delay is the delay between switching an aspect of incoming audiovisual data to a video sink, such as audiovisual data source, audiovisual data resolution and audiovisual data refresh rate, and the incoming audiovisual data being displayed on the video sink. Not only must devices authenticate the HDCP link before video transmission, each time an upstream HDCP link is switched, downstream HDCP links may be affected as well because audiovisual data transmission to downstream links is interrupted. Each time video transmission is interrupted between an HDCP transmitter and an HDCP receiver, the HDCP link fails Part Three of the authentication process and the authentication process must be restarted from Part One. This includes downstream connections that were previously authenticated with each other.

For example, in a video distribution network comprising a first HDCP-compliant video source and a second HDCP compliant video source connected to an HDCP compliant video sink via an HDCP compliant video switcher, when the video source transmitting HDCP content to the video sink is switched from the first video source to the second video source, not only must the second video source authenticate with the video switcher, but the downstream link between the video source and the video switcher must also be re-authenticated due to the disruption in video transmission. This despite the fact that the HDCP link between the video source and the video switcher was already authenticated. This issue becomes increasingly burdensome in expansive video distribution networks with many layers (i.e. a large tree topology).

Additionally, when video transmission is interrupted between an HDCP transmitter and an HDCP receiver due to upstream switching and HDCP authentication, any downstream video scalers must lock back on the incoming audiovisual data before outputting any scaled audiovisual data. This introduces delay in addition to the delay introduced by the HDCP authentication process. For example, each time video transmission to a sink is interrupted, video scaler internal to the sink will take anywhere between two and ten seconds to lock onto the incoming audiovisual data again. Those skilled in the art will recognize that scaler operation is unpredictable and varies due to hardware and firmware specification. Often, video scalers included in video sinks are not optimized for reducing switching delay. Also unpredictable is video sink response while embedded video scalers achieve video lock. Presented with interrupted video, the video sink may display snow, pixilated images, video artifacts or a blank screen while internal scaler achieves video lock dependent on video sink manufacturer.

Because the HDCP authentication process operates in the background, often unknown to the user, long switching delays are unfairly blamed on video distribution components. Users may experience the authentication process as a delayed period with snow or disorienting video artifacts. This could result in undeserved user dissatisfaction with the manufacturer of the components in the video distribution network.

As will be explained below, aspects of the embodiments describe systems, apparatuses and methods for reducing the switching time in a video distribution network. Aspects of the embodiments described herein provide for maintaining authentication of downstream link during a switching discontinuity, minimizing the interruption of video transmission resulting from switching events. By outputting continuous video timing data to a sink over a downstream HDCP link, even during switching discontinuities, the downstream HDCP link satisfies the maintenance check in step three of HDCP authentication. Accordingly, steps one and two of the HDCP authentication protocol need not be repeated. Additionally, as a result of maintaining the authentication of the HDCP link by outputting continuous video timing data during switching discontinuities, video scalers downstream of the HDCP link (i.e., internal video sink scalers) will not lose video lock with the incoming video stream thereby reducing delay times further. Finally, by outputting black frames of image data, the content displayed during switching events is controlled.

Figure 3:
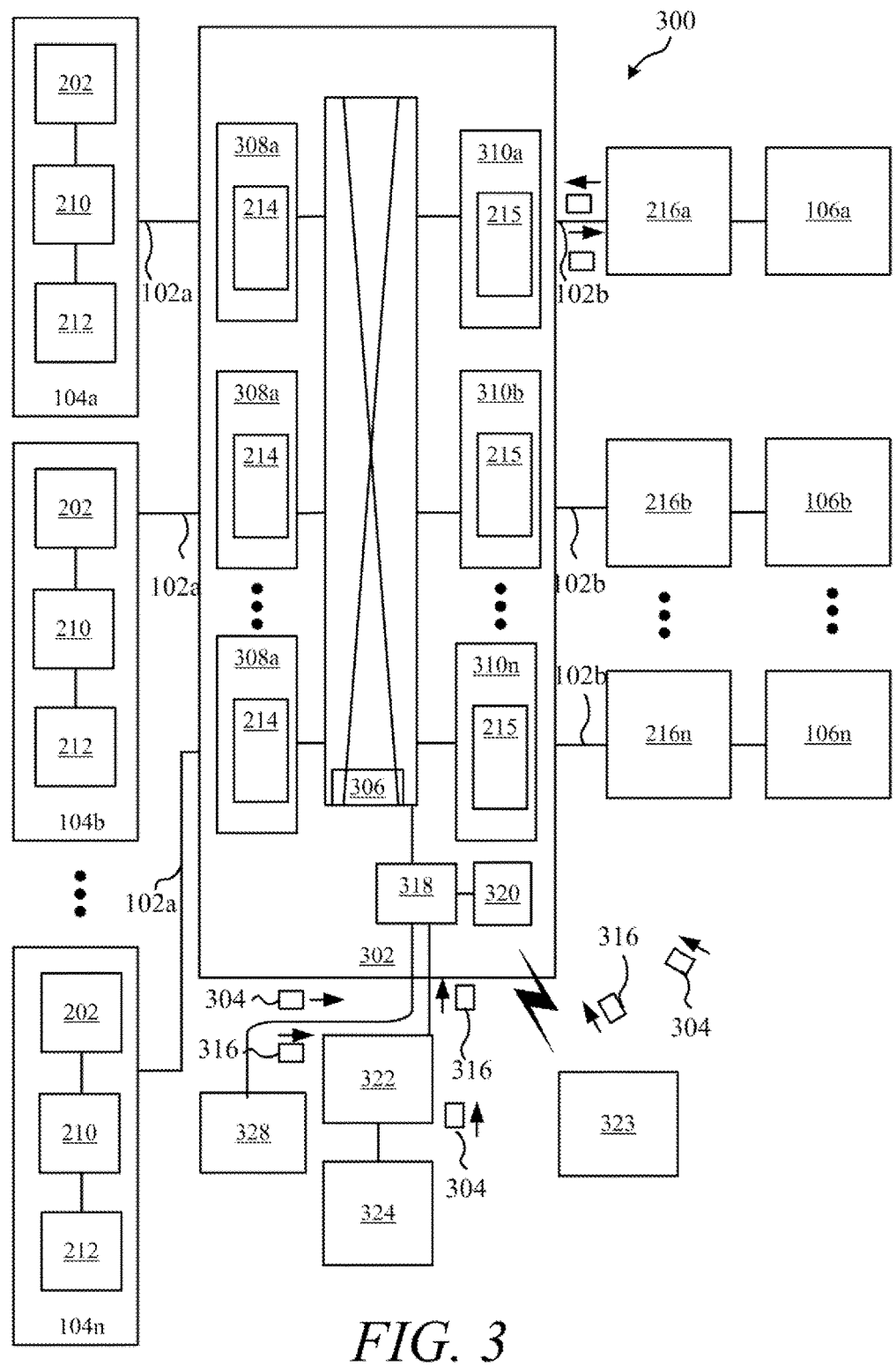
FIG. 3 is a block diagram of an inventive switcher device according to aspects of the embodiments.

FIG. 3 is a block diagram of an inventive switcher device configured for reducing switching time in a video distribution network. The video distribution network 300 is an HDCP system and includes at least one source 104a, 104b, . . . , 104n (collectively 104) and at least one sink or display 106a, 106b, . . . , 106n (collectively 106). At least two sources 104 include an HDCP transmitter 212, such as an HDMI transmitter, configured to transmit audiovisual data comprising video timing data and image content data to the at least one sink 106. Each source 104 further includes a graphic generator (not shown) to generate a graphic or image. The HDCP transmitter 212 receives the HDCP content 202 from an upstream content control function 210.

At least one sink includes an HDCP receiver, such as an HDMI receiver. The source 104 determines via the authentication process what content can be viewed, recorded, and shared based on sinks/displays 106 that support HDCP and sinks/displays 106 that does not support HDCP. The output of the source 104 is connected to an input board 308 for a switcher device 302 through their HDCP-protected interfaces 304 and the switcher device 302 serves as an HDCP repeater for HDCP compliant content. An output board 310 for the switcher device 302 is connected to the input of the sink/display 106 via another interface 102b. The interface 102a, 102b for the input board and the output board of the switcher device 302 may be an HDMI cable that carries a variety of signals such as one or more of TDMS, DDC, hot plug detect (HPD), and RxSense, among others. As will be described later, the interface 102a, 102b for the input board and output board of the switcher device 302 may also be a combination of one or more shielded twisted pairs (STP) and one or more unshielded twisted pairs (UTP), such as DigitalMedia (DM) cable available from Crestron Electronics, Inc. of Rockleigh, N.J.

When an HDCP source 104 (more specifically source 104a) detects an RxSense signal from an HDCP compliant sink/display 106 (more specifically sink/display 106a), the source 104a will transmit HDCP content 202 to the sink/display 106a after the authentication process is successful.

The audiovisual data 202 is encoded into three data channels. These channels and a TMDS clock are carried over four differential pairs from the source 104 to the sink/display 106. The DDC is a communications interface similar to I2C. This interface provides two-way communication in a master-slave relationship. The upstream device 104 is the DDC master and the downstream device 106 is the DDC slave. The HDCP receiver indicates its presence to the HDCP transmitter with the HPD signal. The HDCP transmitter 212 is the HDCP Device most upstream, and receives the HDCP content 202 from an upstream content control function 210.

The switcher device 302, functioning as an HDCP repeater, is a fully modular and expandable matrix switcher offering low-latency digital video and audio switching, and HD lossless multi-room signal distribution, for all types of A/V sources. The switcher device 302 may be a Crestron Digital Media Switcher available from Crestron Electronics, Inc. of Rockleigh, N.J.

The Crestron Digital Media Switcher is field-configurable to handle, but not limited to, eight, sixteen, and thirty-two audiovisual sources of virtually any type via input boards. The outputs are also field-configurable to provide, but not limited to, eight, sixteen, and thirty-two room outputs and/or HDMI outputs in a single chassis. The chassis comprises slots for the insertion of input and output boards. As will be described later, the input boards and output boards may be input boards and output boards, respectively, of the switcher device 302. Additionally, the input boards and output boards may operate external of the chassis of the Digital Media Switcher and be coupled to the Digital Media Switcher via intermediate cards inserted into slots in the chassis.

The switcher device 302 includes a multiplexer 306 coupled in-between the at least one input board 308a, 308b, 308n (collectively 308) and at least one output board 310a, 310b, 310n (collectively 310). The multiplexer 306 may be, but is not limited to, a mechanical switch, electrically operated switch, solid state relay, latching relay, reed relay, single-pole single-throw (SPST) relay, single-pole double-throw (SPDT) relay, double-pole single-throw (DPST) relay, and double-pole double-throw (DPDT) relay.

The multiplexer 306 transmits an audiovisual data signal 202 from one of the at least two input boards 308 to a first output board 310a. The multiplexer 306 dynamically switches between the first input board 308a and at least a second input board 308b based on a user control signal 316 that selects either the first video source 104a or second video source 104b to be displayed on the video sink 106a. The output board 310 is coupled to the at least one sink/display 106 via an interface cable 102b. The interface cable 102b may be an HDMI cable. The switcher 302 further includes a processing unit 318 coupled to the multiplexer 306. The processing unit 318 includes at least one transceiver 320 for bidirectional communications with an end user device (e.g., 324, 326), in part, to receive the user control signal 316. The end user device 324, 326 transmits the user control signal 316 from a touch panel display 324 via a control system 322. An end user may also transmit the user control signal 316 from a wireless device 326. Software tools 328 may be loaded onto the wireless device and/or touch panel 324 to assist the end user in selecting a desired source 104 and the sink 106. In response to the user selecting the desired source 104 for the sink 106, the end user device transmits the user control signal 316 to the switcher device 302.

Upon the user selecting the desired source 104 for the at least one desired display 106, the source 104 will authenticate with the switcher device 302 as described above. The switcher device 302 will authenticate with the at least one desired downstream sinks 106 as described above. Once the authentication is complete, the source 104 will transmit the HDCP content (i.e. HDCP protected audiovisual data) via the HDCP link between the source and the repeater. This HDCP link comprises the HDCP transmitter 212 of the source, an HDCP interface, and an HDCP receiver 214 of the first input board 308a. The HDCP receiver of the input board 308a receives the HDCP content and provides the audiovisual data unencrypted to the multiplexer 306. The multiplexer 306, dependent on the user control signal 316, routes the unencrypted audiovisual data to the desired output board 310. The output board 310 processes and encrypts the audiovisual data and then transmits the HDCP content to the desired sink 106 over an HDCP link between the output board 310 and the video sink 106. The HDCP link between the output board 310 and the video sink 106 comprises an HDCP transmitter 215 of the output board, HDCP interface and HDCP receiver of the video sink.

The multiplexer 306 is configured to dynamically route the audiovisual data according to the user control signal received at the processing unit 318. For example, a user viewing content from a first source 104a, such as a cable tuner, may desire to switch to a second source 104b, such as a Blu-ray disc player. When the multiplexer 306 switches from routing audiovisual data from the first source to routing audiovisual data from the second source 104b, the output board 310 experiences a switching delay as a result of the delay caused by upstream HDCP authentication and multiplexer 306 operation. A similar switching discontinuity may also result from a change in resolution or change in refresh rate of the received audiovisual data.

The output board 310 of the inventive switcher device 302 is configured to continuously output audiovisual data including video timing data and image content data during switching discontinuities such that the HDCP link between the output board 310 and the video sink 106 remains authenticated during the switch and an aesthetically pleasing display is shown during said switch. For example, the output board 310 may output black frames of audiovisual data during switching discontinuities. Switching delay in the video distribution network 300 is minimized by maintaining the authentication of the HDCP link by continuously outputting video timing data. Additionally, by continuously outputting video timing data to the video sink during switching discontinuities, video lock is maintained in video processing devices, such as scalers, downstream from the output board 310 (i.e. scalers internal to video sink), thereby further minimizing switching delay.

Figure 4:
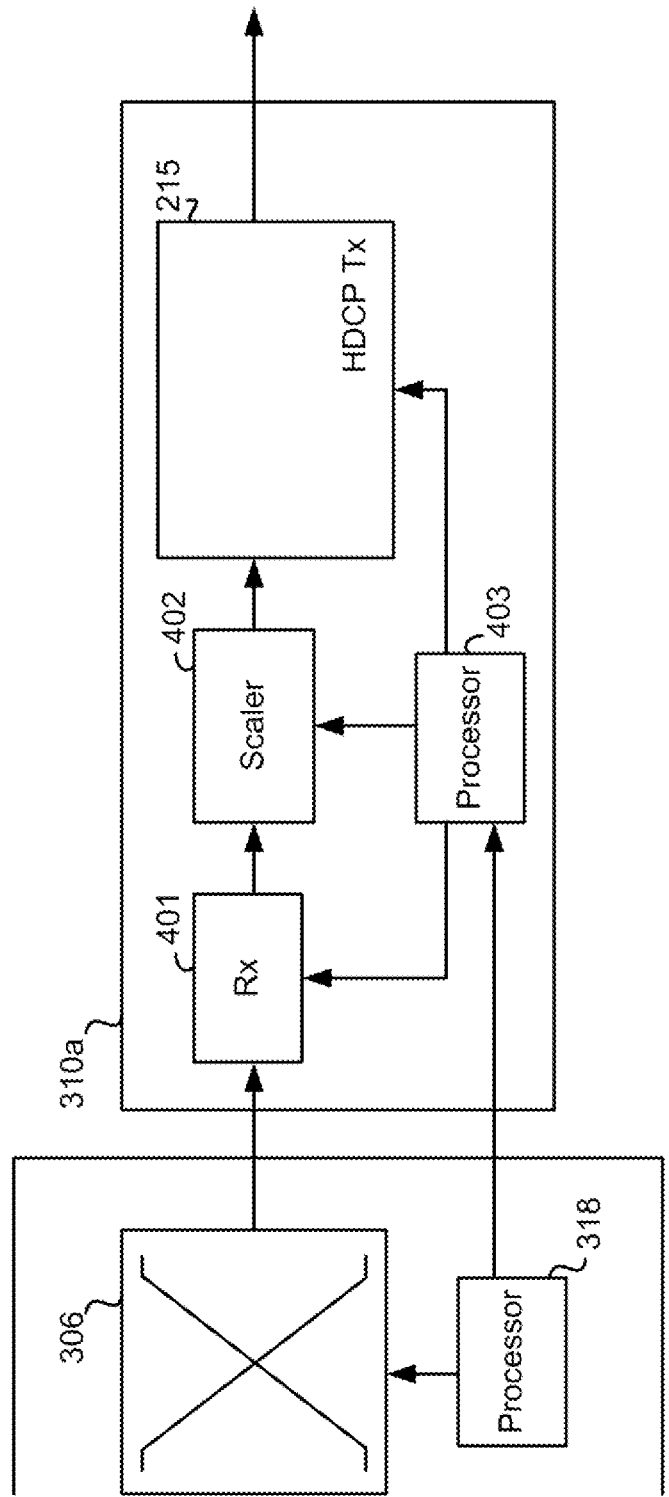
FIG. 4 is a block diagram of the switcher device shown in FIG. 3, according to aspects of the embodiments.

FIG. 4 is a block diagram of a portion of the switcher device 302 shown in FIG. 3. The output board 310a further comprises a receiver 401, an output scaler 402, an output processing unit 403 and an HDCP transmitter 215. The receiver 401 is configured to receive audiovisual data routed from the first input board 308a or second input board 308b via the multiplexer 306. As described below, according to aspects of the embodiments, the receiver 401 is an HDCP receiver configured for receiving HDCP encrypted content.

The output scaler 402 receives the audiovisual data from the receiver 401 and is adapted to convert the received audiovisual data to a native resolution of the video sink 106. The output board 310 may receive the native resolution of the video sink 106 via an EDID channel. Those skilled in the art will recognize that the operation of video scalers embedded in end user devices are idiosyncratic depending on manufacturer and may perform substantially below par, resulting in poor video quality and delayed performance. By converting to the native resolution of the video sink 106, video processing is minimized in downstream embedded video scalers.

According to aspects of the embodiments, the output scaler 402 of the output board 310 is adapted for operating in a pass through mode in which the output scaler detects the resolution of the incoming audiovisual data via the video timing data. The output scaler passes the incoming audiovisual data through to the HDCP transmitter if the audiovisual data is routed to the output board already at a native resolution of the video sink.

The output scaler 402 is further adapted to generate audiovisual data comprising video timing data and image content data during switching discontinuities. For example, during a switching discontinuity between receiving audiovisual data from a first source 104a and audiovisual data from a second source 104b, the output scaler 402 may output black frames. By outputting a continuous stream of audiovisual data, more specifically video timing data, to the HDCP transmitter 215, the HDCP link between the output board 310 and the source is maintained as authenticated during the switch. In addition, by outputting black frames of audiovisual data, more specifically image content data, the end user experiences a clean transition from the first source 104a to the second source 104b. According to aspects of the embodiments, the output scaler 402 may generate frames of image content data of a color other than black, or may generate image content data comprising an image, such as a corporate logo.

According to aspects of the embodiments, prior to outputting audiovisual data from the second source 104b, the output scaler 402 must receive a sufficient amount of audiovisual data from the second source 104b. This is known as achieving video lock. Following a switching discontinuity, the output scaler 402 is further adapted to generate image content data until video lock is achieved. By generating image content data until the output scaler 402 achieves video lock, the user is presented with a clean transition during switching events.

The output scaler 402 is adapted to operate in a free run mode by automatically generating video timing data during switching discontinuities.

The output scaler 402 is adapted to generate image content data in response to control signals from the output processing unit 403. Upon receiving the user control signal to switch the source of audiovisual data and prior to transmitting a switching signal to the multiplexer 306, the switcher processing unit 318 transmits a prepare signal to the output processing unit 403. The output processing unit 403 in turn instructs the output scaler 402 to generate black frames of audiovisual data.

The HDCP transmitter 215, such as an HDMI transmitter, converts and encodes the audiovisual data output from the output scaler 402 to one or more TMDS signals for transmission to the video sink 106 over the HDCP interface. According to aspects of the embodiments, the HDMI transmitter comprises an HDCP transmitter chip and may further comprise TMDS encoders or decoders and other HDMI-specific features. The audiovisual data is re-encrypted in accordance with the shared secret from authentication between the HCDP repeater and the HDCP sink. The HDCP transmitter 215 receives the native resolution and the native refresh of the sink via a display data channel (DDC) of the interface. The HDCP interface between transmitter and the HDCP receiver may be HDMI.

Figure 5:
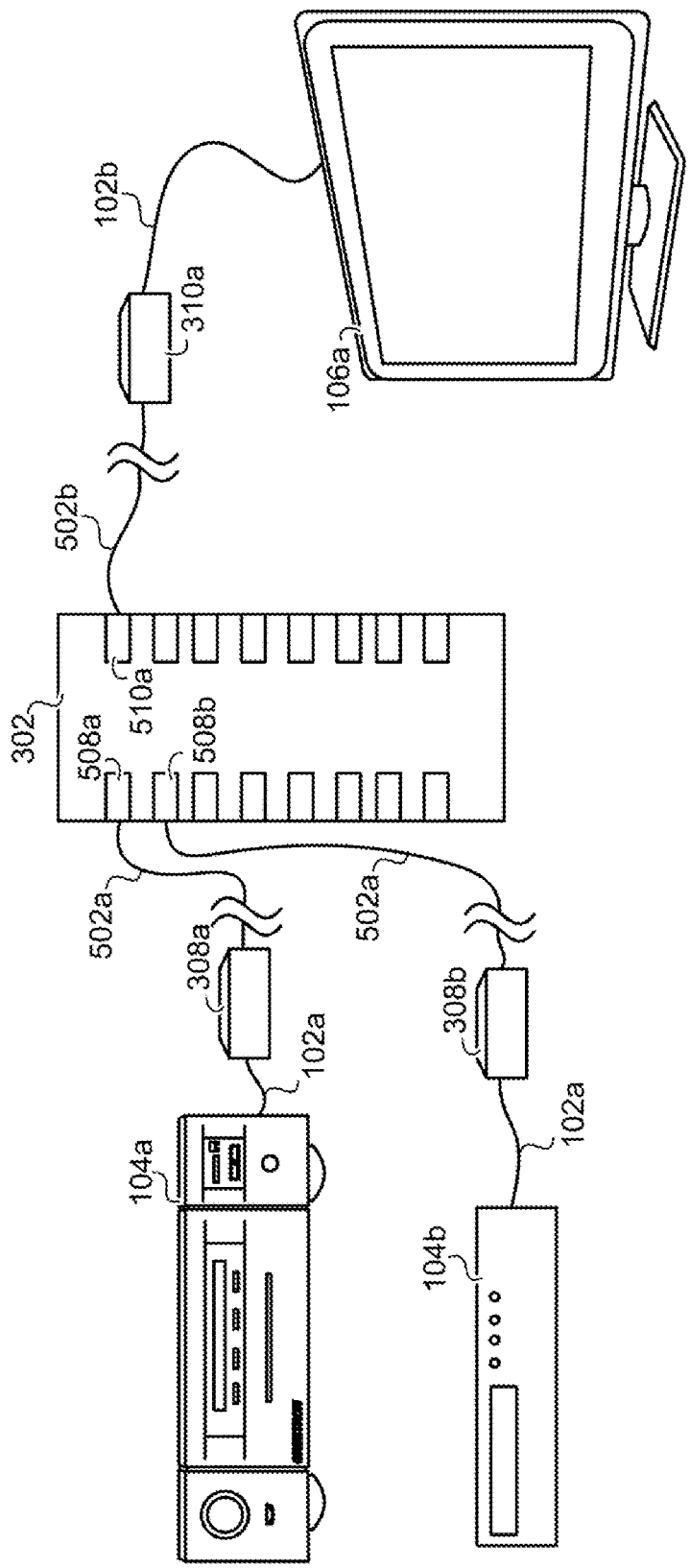
FIG. 5 shows a video distribution network, according to aspects of the embodiments.

FIG. 5 shows the switcher device 302 in a video distribution network 300, according to further aspects of the embodiments in which the output board 310 is contained in a housing external to the switcher device 302. The video distribution network 300 comprises an extended transmission board 510 coupled between the multiplexer 306 and the output board 310. The video distribution network 300 further comprises an extended reception board 508. According to aspects of the embodiments, the extended reception board 508 and extended transmission board 510 may be modular input and output boards, respectively, configured to be inserted into the switcher device 302. As described below, the extended transmission and reception boards allow for extended cable lengths that increases the functionality of the video distribution network 300. For example, the output board 310 may be collocated in the same area as its corresponding video sink 106. The switcher device 302 may be remotely located in a central location or out of view, such as in an equipment closet. Similarly, the first input board 308a and second input board 308b may be collocated with the first video source 104a and the second video source 104b, respectively.

According to aspects of the embodiments, the output board 310 is adapted for receiving encrypted audiovisual data via an HDCP link. The extended transmission board 510 is communicatively coupled between the multiplexer 306 and the output board 310 and is adapted for encrypting the audiovisual data routed by the multiplexer 306 and transmitting the encrypted audiovisual data to the output board 310 via an HDCP link. The HDCP link comprises an HDCP transmitter 615 of the extended transmission board 510, an HDCP interface 502 and an HDCP receiver 401 of the output board 310. The HDCP interface 502 may be one or more pairs of twisted cable or fiber optical cable, such as DigitalMedia cable available from Crestron Electronics, Inc. of Rockleigh N.J. Those skilled in the art will recognize that DigitalMedia cable is a multi-generational family of interface cables particularly designed for media transmission for extended lengths.

Within a single plenum-rated jacket, original DigitalMedia cable contains one high-bandwidth/low-crosstalk shielded 4-twisted pair (STP) cable, one CAT5e unshielded 4-twisted pair (unshielded twisted pair (UTP)) cable, and one DMNet cable. The STP "Audiovisual data" cable is of a specialized construction designed to allow the longest possible cable lengths for transporting high-definition digital video and audio. The Cat5e "Data Management" cable carries high-speed Ethernet and other data, plus 5V direct current (DC) power. Finally, the DMNet cable carries additional proprietary control signals and 24V DC power. Original DigitalMedia cable is rated for up to 220 ft of audiovisual transmission.

Figure 6:
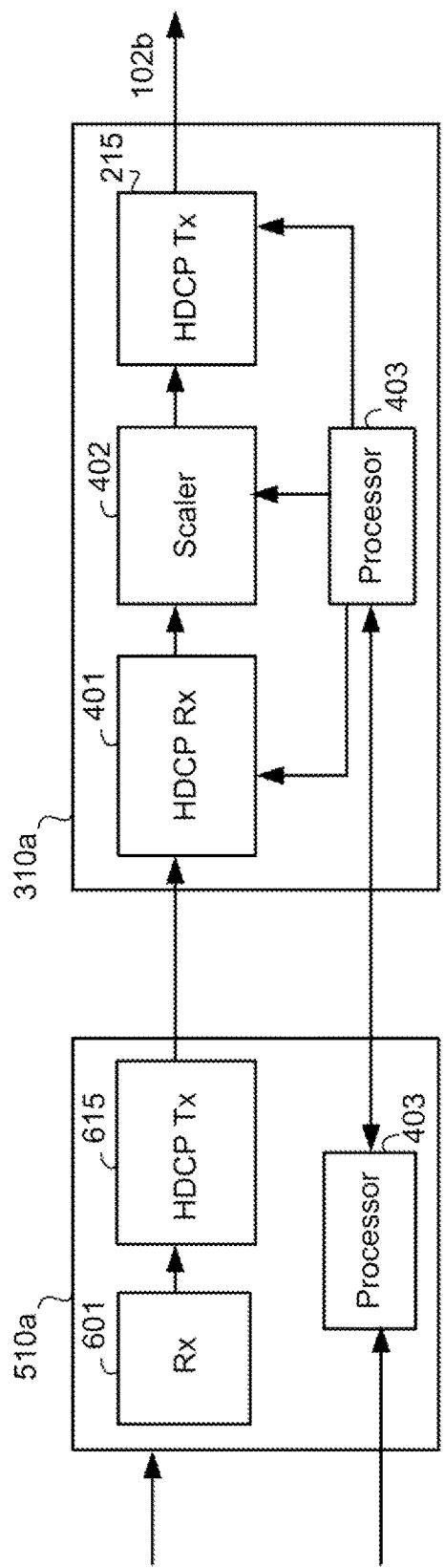
FIG. 6 is a block diagram of the output board shown in FIG. 5, according to aspects of the embodiments.

FIG. 6 is a block diagram of the extended transmission board and the output board shown in FIG. 5, according to aspects of the embodiments. The block diagram of the output board 310 is similar to the block diagram of the output board 310 in FIG. 4, with the exception being that in FIG. 5, the receiver 401 is an HDCP receiver configured for receiving HDCP content over an HDCP interface 502. The extended transmission board 510 comprises a receiver 601 and an HDCP transmitter 615.

Figure 7:
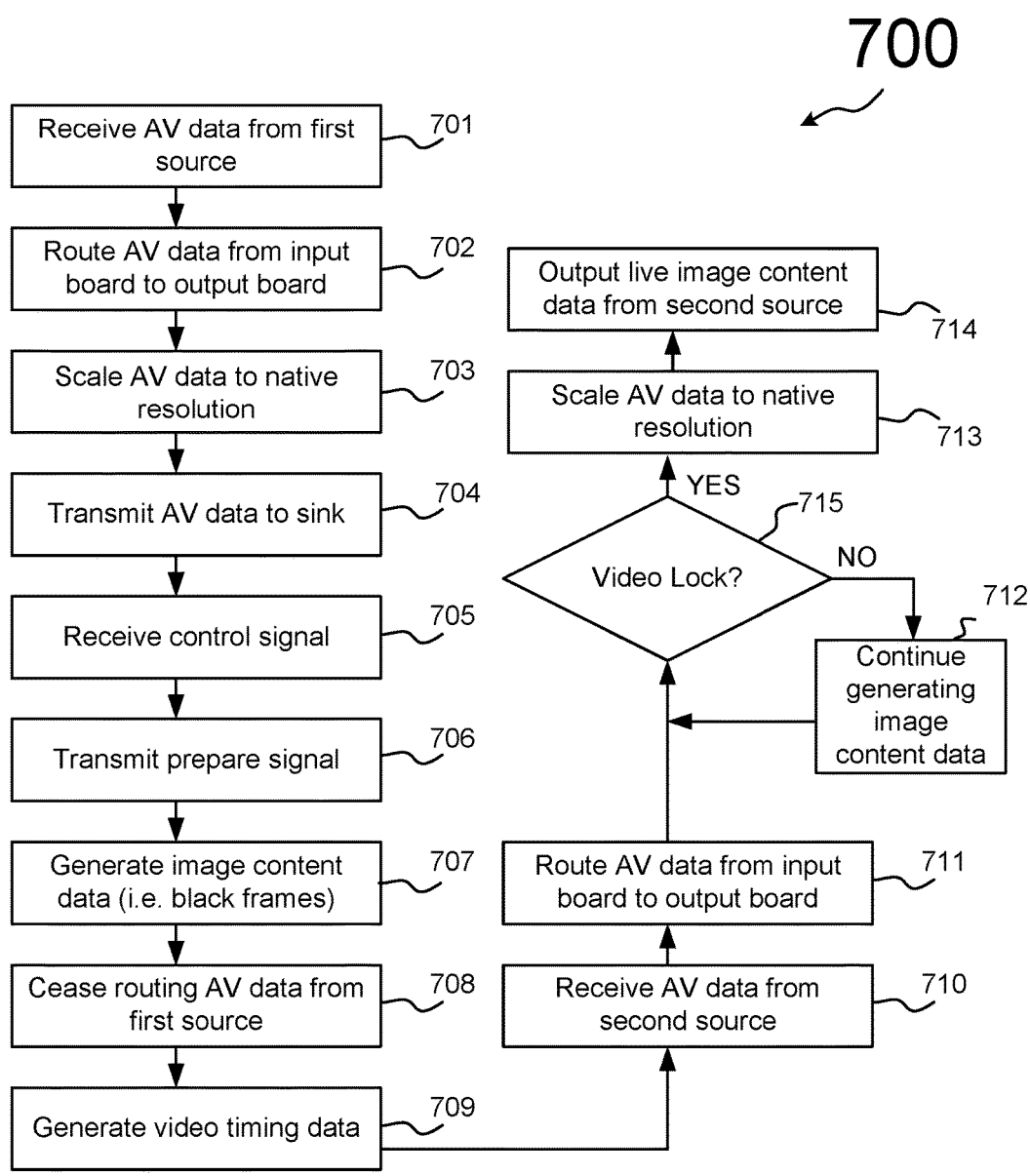
FIG. 7 is a flowchart illustrating steps in a method for reducing the switching time in a video distribution network, according to aspects of the embodiments.

FIG. 7 is a flowchart illustrating steps of method 700 for reducing the switching time in a video distribution network 300, according to aspects of the embodiments.

In step 701, a switcher device 302 receives audiovisual data at a first input board 308a via an HDCP link between a first video sink 106a and the first input board 308a.

In step 702, the switcher device 302 routes audiovisual data from the first input board 308a to an output board 310a.

In step 704, the output board 310 transmits audiovisual data to a video sink 106 over a security protocol link. According to aspects of the embodiments, the output board 310 scales the audiovisual data received from the first input board 308a to the native resolution of the video sink 106 (step 703) prior to transmitting to the video sink 106.

In step 705, the processing unit 318 of the switcher device 302 receives a control signal to switch from routing audiovisual data from the first input board 308a to routing audiovisual data from the second input board 308b.

According to aspects of the embodiments, the switcher device processing unit 318 transmits a prepare signal to the output board 310a, indicating that there will be a switching discontinuity (step 706).

According to aspects of the embodiments, the output board 310a generates image content data, such as black frames of video, in response to receiving the prepare signal from the switcher device processing unit 318 (step 707). The scaler 402 outputs the generated image content data rather than the live image content data being routed to the output board 310a from the multiplexer 306.

In step 708, the multiplexer 306 ceases routing audiovisual data from the first input board 308a.

In step 709, the output board 310 continues generating video timing data at a native resolution during the delay between receiving audiovisual data from the first input board 308a and receiving audiovisual data from the second input board 308b. By outputting a continuous stream of video timing data, the output board 310a maintains the authenticity of the security link between the output board 310a and the video sink 106.

In step 710, the switcher device 302 receives audiovisual data at a second input board 308b via an HDCP link between a second video sink 106b and the second input board 308b.

In step 711, the switcher device 302 routes audiovisual data from the second input board 308b to the output board 310a.

Following step 711 is decision step 715. In decision step 715, it is determined whether video lock has occurred. If video lock has occurred ("Yes" path from decisions step 715), method 700 proceeds to step 713. If video lock has not occurred ("No" path from decision step 715), method 700 proceeds to step 712, and continues to monitor video data to determine if video lock has occurred.

In step 712, the output board continues generating and outputting image content data (i.e. black frames of video) until video lock is achieved.

In step 714, the output board 310a transmits live image content data routed from the second input board 308a to the video sink 106 over an HDCP link. According to aspects of the embodiments, the output board 310a scales the audiovisual data received from the first input board 308a to the native resolution of the video sink 106 (step 713) prior to transmitting to the video sink 106.

The following is a pseudo-code representation of the operation in accordance with aspects of the embodiments.

Detect a user control signal to switch from a first video source to a second video source.

Transmit a prepare signal to a processing unit of an output board in response to the detection of the user control signal.

Detect the prepare signal at the output boar.

Instruct scaler to generate image content data.

Cease routing audiovisual data from a first video source to the output board.

Continue generating video timing data at the scaler of the output board.

Begin routing audiovisual data from a second video source to the input board.

Cease generating image content data upon achieving video lock.

According to aspects of the embodiments, the video distribution system leverages a backdoor communication bus to prepare downstream devices, such as an output board 310 internal to the switcher device 302 or external to the switcher device 302, for a switching event.

Prior to a switching event, the switcher processing unit 318 transmits a prepare signal to downstream devices to prepare for a switching event. Each downstream device then relays the prepare signal to their downstream devices until the prepare signal is received at each necessary output board 310. For example, downstream devices may comprise additional switcher devices, output boards or intermediary relay devices, and output boards 310 may comprise output boxes and output cards outputting audiovisual data to a video sink.

Output scalers 402 in the output boards 310 then "freeze" the current video in anticipation of the switch by ceasing transmission of scaled live audiovisual data to the sink and instead generate and output audiovisual data comprising a repeated frame of image content data. The repeated frame of image content data may be a frame of image content data received from the first audiovisual source prior to the switching event. By generating a repeated frame of image content data from the first audiovisual source, the video displayed on the video sink will appear to have momentarily frozen.

The switcher processing unit 318 directs the multiplexer 306 to perform the switching event subsequent to transmission of the prepare signal. The switcher processing unit 318 may direct the multiplexer 306 to perform the switch upon a predefined amount of time after transmitting the prepare signal or may direct the multiplexer 306 subsequent to confirming reception of the prepare signal.

The output scaler 402 generates and outputs the repeated frame of image content data until it has achieved video lock with the audiovisual data it receives subsequent to the switching event. By freezing and then unfreezing the video displayed on the video sink, the output scaler 402 achieves the look of an "instant switch" which is aesthetically pleasing to viewers and provides the perception of an instantaneous switch. According to aspects of the embodiments, while the video system may distribute secure content, such as HDCP protected content, the content does not necessarily need be protected content.

Figure 8:
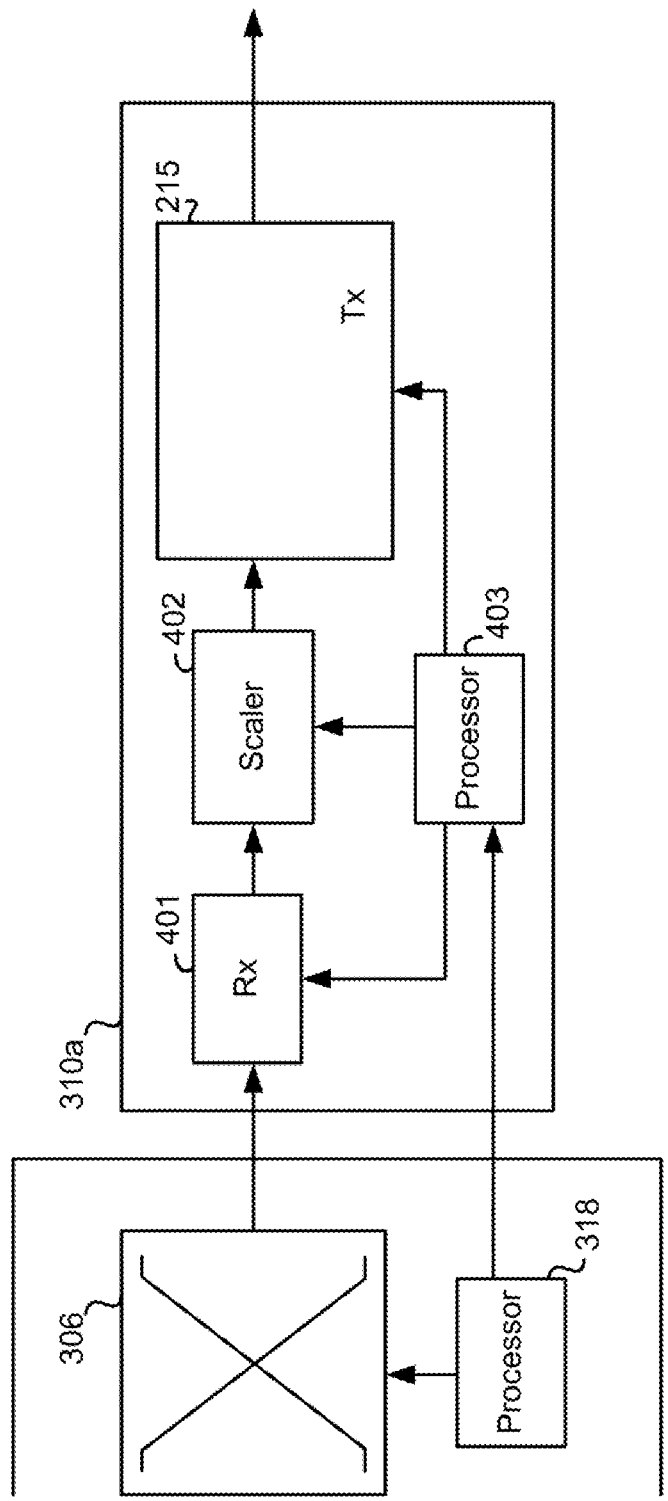
FIG. 8 is a block diagram of a switcher device and extended transmission board, according to aspects of the embodiments.

FIG. 8 shows a block diagram of a portion of the switcher device, according to aspects of the embodiments. The multiplexer 306 transmits an audiovisual data signal from the first input board to a first output board 310a. The multiplexer 306 dynamically switches between the first input board and a second input board based on a user control signal that selects either the first video source or second video source to be displayed on the video sink.

The output board may be a card configured for being inserted into the switcher device or may be external to the switcher device. According to aspects of the embodiments, there may be one or more intermediary devices between the multiplexer 306 and the output board such as additional switcher devices and relay devices as shown in the video distribution system of FIG. 10. The output board comprises a receiver, an output scaler 402, an output processing unit 403 and a transmitter 215. As discussed above, the transmitter 215 may be an HDCP transmitter. The receiver 401 is configured to receive audiovisual data routed from the first input board or second input board via the multiplexer 306. The receiver may be an HDCP receiver configured for receiving HDCP encrypted content.

The output scaler 402 receives the audiovisual data from the receiver and is configured to convert the received audiovisual data to a native resolution of the video sink. The output board may receive the native resolution of the video sink via an EDID channel. Those skilled in the art will recognize that the operation of video scalers embedded in end user devices are idiosyncratic depending on manufacturer and may perform substantially below par, resulting in poor video quality and delayed performance. By converting to the native resolution of the video sink, video processing is minimized in downstream embedded video scalers.

According to aspects of the embodiments, the output scaler 402 of the output board 310 is adapted for operating in a pass through mode in which the output scaler 402 detects the resolution of the incoming audiovisual data via the video timing data. The output scaler 402 passes the incoming audiovisual data through to the transmitter 215 if the audiovisual data is routed to the output board 310 already at a native resolution of the video sink.

The output scaler 402 is further adapted to generate audiovisual data comprising video timing data and image content data prior to and during switching discontinuities. The output scaler 402 may further comprise a memory buffer and a frame buffer for generating and outputting a repeated frame of video to the video sink.

According to aspects of the embodiments, prior to and during a switching discontinuity from a switching event, the output scaler 402 may output a repeated frame of image content data from the audiovisual data received from the first source. For example, upon receiving the prepare signal from the multiplexer 306, the output scaler 402 will "freeze" the video displayed on the video sink by generating and outputting a repeating frame of image content data from the audiovisual data received from the first source. The output scaler 402 is configured for continuing to generate and output audiovisual data comprising video timing data and the repeated frame of image content data while the switcher device ceases routing audiovisual data from the first video source and begins routing audiovisual data from the second video source.

The output scaler 402 must receive a sufficient amount of audiovisual data from the second source 104b prior to outputting live audiovisual data from the second source 104b. This is known as achieving video lock. Following a switching discontinuity, the output scaler 402 is further configured to generate the video timing data and repeated frame of image content data until video lock is achieved. Upon achieving video lock with the incoming video after the switching discontinuity, the output scaler 402 will then "unfreeze" the video by ceasing outputting the repeating frame and instead outputting the live scaled video. By repeating a frame of video, the user is presented a cleaner and more aesthetically pleasing switch consisting of a momentarily, and in some instances imperceptible, frozen screen.

In addition to the aesthetic advantages and perceived reduction in switching time by the user, aspects of the embodiments reduce the switching time by maintaining scaler lock in any downstream scalars such as scalars embedded in video sinks. In HDCP systems switching time is further minimized. By outputting a continuous stream of audiovisual data, more specifically video timing data, to the HDCP transmitter 215, the HDCP link between the output board and the source is maintained as authenticated during the switch.

The output scaler 402 is adapted to generate image content data in response to control signals from the output processing unit 403. The communication interface between the switcher processing unit 318 and the output processing unit 403 may be an Ethernet interface. According to aspects of the embodiments, the prepare signal may be a user datagram protocol (UDP) packet transmitted over the Ethernet interface. However, aspects of the embodiments are not limited to UDP packets transmitted over Ethernet. In other aspects of the embodiments, the interface may be a serial peripheral interface (SPI) or may be an HDMI interface transmitting the prepare signal as an info-frame packet.

Upon receiving the user control signal to initiate a switching event and prior to transmitting a switching signal to the multiplexer 306, the switcher processing unit 318 transmits a prepare signal to the output processing unit 403 via a communication interface. The output processing unit 403 in turn instructs the output scaler 402 to generate a repeated frame of audiovisual data.

According to aspects of the embodiments, the switcher processing unit 318 may broadcast the prepare signal to each connected downstream device. Each downstream device may in turn process and broadcast the prepare signal to each of its connected downstream devices. As will be discussed below, in further aspects of the embodiments, the switcher processing unit 318 may transmit directly to each necessary output scaler 402. The prepare signal may comprise an address, such as a network address of an output card or output box.

The transmitter 215 is configured for converting and encoding the audiovisual data from the output scaler 402 for transmission to the video sink. According to aspects of the embodiments, the transmitter 215 is an HDCP transmitter 215. The HDCP transmitter 215, such as an HDMI transmitter 215, converts and encodes the audiovisual data output from the output scaler 402 to one or more TDMS signals for transmission to the video sink over the HDCP interface. According to aspects of the embodiments, the HDMI transmitter 215 comprises an HDCP transmitter 215 chip and may further comprise TMDS encoders or decoders and other HDMI-specific features. The audiovisual data is re-encrypted in accordance with the shared secret from authentication between the HCDP repeater and the HDCP sink. The HDCP transmitter 215 receives the native resolution and the native refresh of the sink via a DDC of the interface. The HDCP interface between transmitter 215 and the HDCP receiver may be HDMI.

Figure 9:
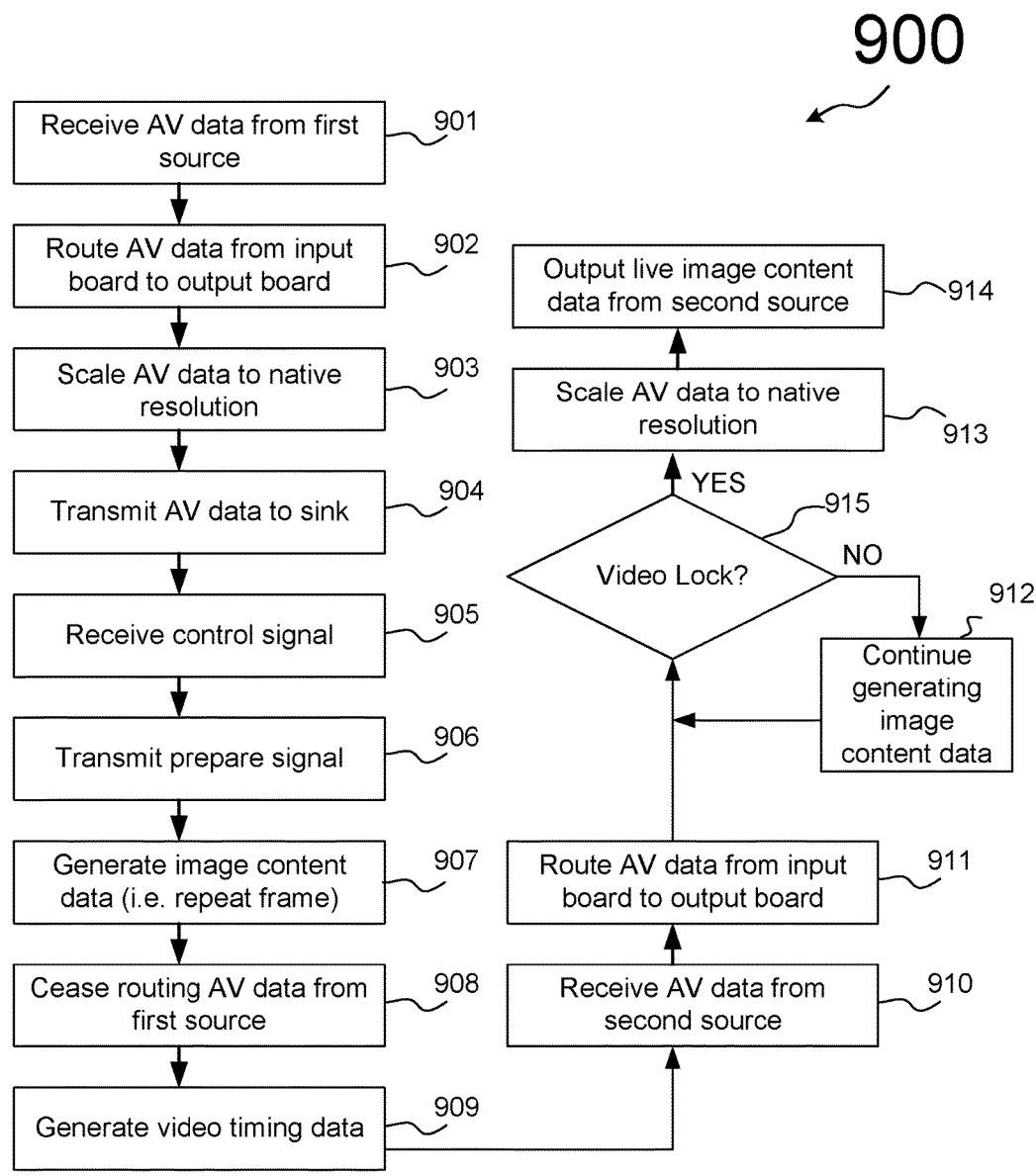
FIG. 9 is a flowchart illustrating steps in a method for reducing the switching time in a video distribution network, according to aspects of the embodiments.

FIG. 9 is a flowchart illustrating steps to perform method 900 for reducing the switching time in a video distribution network, according to aspects of the embodiments.

In step 901, a switcher device receives audiovisual data at a first input board via an AV link between a first video sink and the first input board.

In step 902, the switcher device routes audiovisual data from the first input board to an output board.

In step 904, the output board transmits audiovisual data to a video sink over an AV link. According to aspects of the embodiments, the output board scales the audiovisual data received from the first input board to the native resolution of the video sink (step 903) prior to transmitting to the video sink.

In step 905, the processing unit 318 of the switcher device receives a control signal to switch from routing audiovisual data from the first input board to routing audiovisual data from the second input board.

In step 906, the switcher device processing unit 318 transmits a prepare signal to the output board, indicating that there will be a switching discontinuity.

In step 907, the output board generates image content data, such as a repeating frame of video, in response to receiving the prepare signal from the switcher device processing unit 318. The output scaler 402 outputs the generated image content data rather than the live image content data being routed to the output board from the multiplexer 306.

In step 908, the multiplexer 306 ceases routing audiovisual data from the first input board.

In step 909, the output board continues generating video timing data at a native resolution during the delay between receiving audiovisual data from the first input board and receiving audiovisual data from the second input board. By outputting a continuous stream of video timing data, the output board may maintain the authenticity of any security link between the output board and the video sink.

In step 910, the switcher device receives audiovisual data at a second input board via an AV link between a second video sink and the second input board.

In step 911, the switcher device routes audiovisual data from the second input board to the output board.

Following step 911 is decision step 915. In decision step 915, it is determined whether video lock has occurred. If video lock has occurred ("Yes" path from decision step 915), method 900 proceeds to step 913. If video lock has not occurred ("No" path from decision step 915), method 900 proceeds to step 912. In step 912, the output board continues generating and outputting image content data (i.e. repeating frame of video) until video lock is achieved.

In step 914, the output board transmits live image content data routed from the second input board to the video sink over an AV link. According to aspects of the embodiments, the output board scales the audiovisual data received from the first input board to the native resolution of the video sink (step 913) prior to transmitting to the video sink.

The following is a pseudo-code representation of the operation in accordance with aspects of the embodiments.

Detect a user control signal to switch from a first video source to a second video source.

Transmit a prepare signal to a processing unit of an output board in response to the detection of the user control signal.

Detect the prepare signal at the output board.

Instruct output scaler to generate a repeated frame of image content data.

Cease routing audiovisual data from a first video source to the output board.

Continue generating video timing data at the output scaler of the output board.

Begin routing audiovisual data from a second video source to the input board.

Cease generating image content data upon achieving video lock.

According to aspects of the embodiments, the switcher device processing unit 318 is adapted to determine the network topology of the video distribution network and transmitting an addressed prepare signal to each desired output device.

Certain video distribution networks, such as those employed on corporate campuses or educational institutions, may comprise one or more switcher devices 302 connected in a complex topology. In addition to being coupled to one or more output boards 310 (i.e. output cards 310a, output boxes 310b), a switcher device 302 may be communicatively coupled with one or more switcher devices 302 to extend the reach and breadth of the video distribution network. In addition, a single AV source may be routed to more than one AV sink. For example, an AV source may be displayed in multiple conference rooms of a corporate facility. In this example, a switcher device may have to route audiovisual data from the multiplexer 306 to more than one output board 310.

Figure 10:
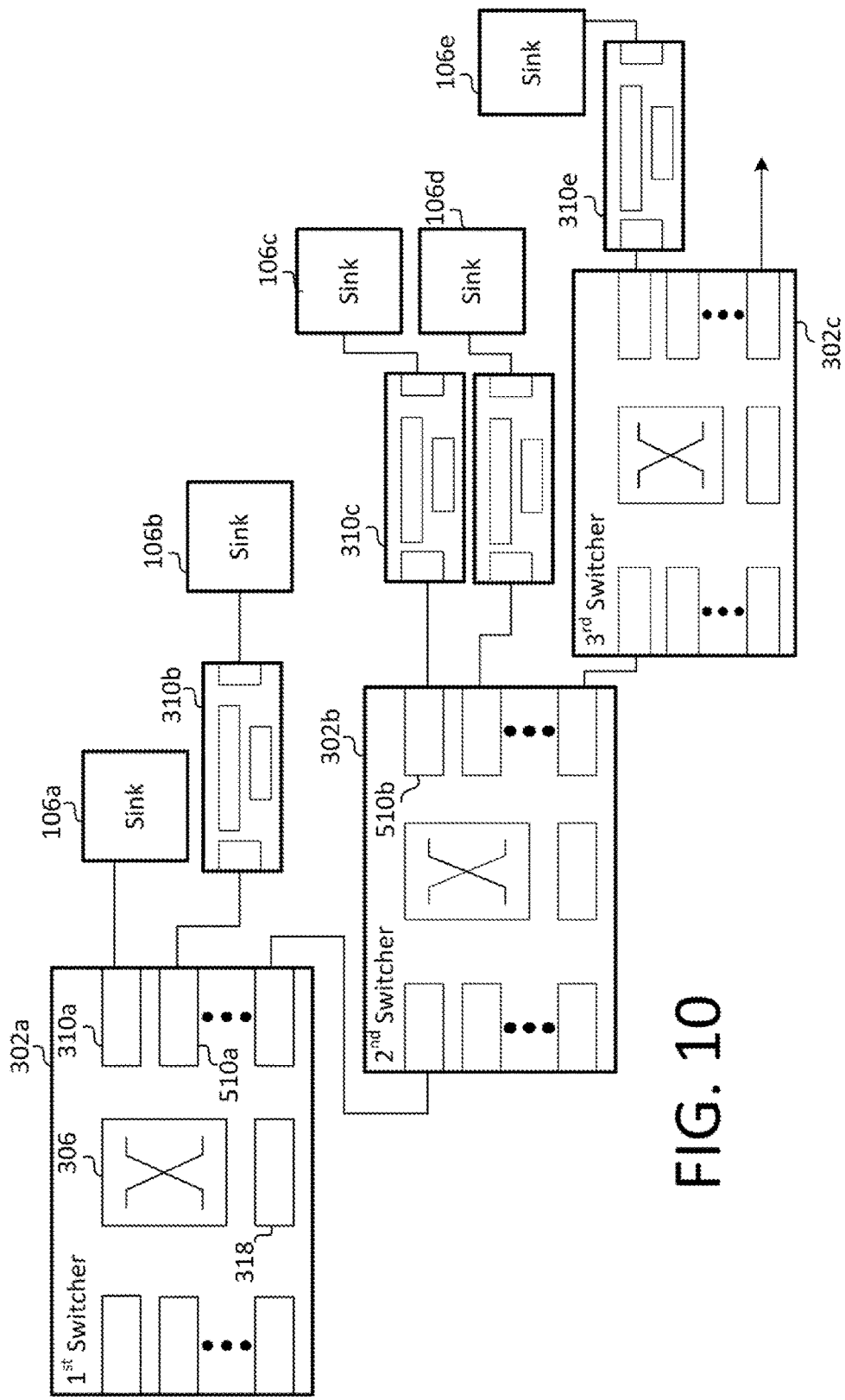
FIG. 10 is a block diagram of a video distribution system, according to aspects of the embodiments.

FIG. 10 is a diagram of a video distribution network according to aspects of the embodiments. The video distribution network 1000 comprises a plurality of cascaded switcher devices 302. According to aspects of the embodiments, an output of a first switcher device 302a is coupled to an input of a second switcher device 302b and an output of the second switcher device 302b is coupled to an input of a third switcher device 302c.

Each successive device adds delay to the switching times during a switching event. Consider, as an example, video distribution network 1000 in which the first switcher device 302a receives audiovisual data at a first input card and routes to a video sink 106e via an output card coupled to a second switcher device 302b and third switcher device 302c and an output box 310e. According to aspects of the embodiments in which the first switcher device processing unit 318 transmits a prepare signal to each of its endpoints (i.e. 310a, 510a . . . 510b), which then process and transmit to each of their endpoints until it reaches the desired endpoint, a noticeable delay will have been introduced to the switching process.

To reduce the delay caused by transmission of the prepare signal, according to aspects of the embodiments, each switcher device is adapted to determine and store the topology of the video distribution network. The switcher devices may determine the topology upon being employed in the video distribution network, upon other devices joining or leaving the video distribution network, at periodic time intervals, or at any other time. The switcher device may determine the topology of the video distribution network via a network scanning tool or other similar technology.

Upon receiving the control signal to initiate a switching event and prior to transmitting a switch command to the multiplexer 306, the switching processing unit 318 transmits a prepare signal addressed to one or more desired endpoints. A desired endpoint is each endpoint comprising a scalar and transmitting audiovisual data to desired sinks. The endpoint may comprise an output board, such as an output card or an output box.

While the switcher processing unit 318 must still transmit via intermediary devices, the switcher processing unit 318 need not broadcast to all downstream devices. Advantageously, the prepare signal does not have to be processed at each intermediary node in the network which reduces latencies and reduces bandwidth.

Figure 11:
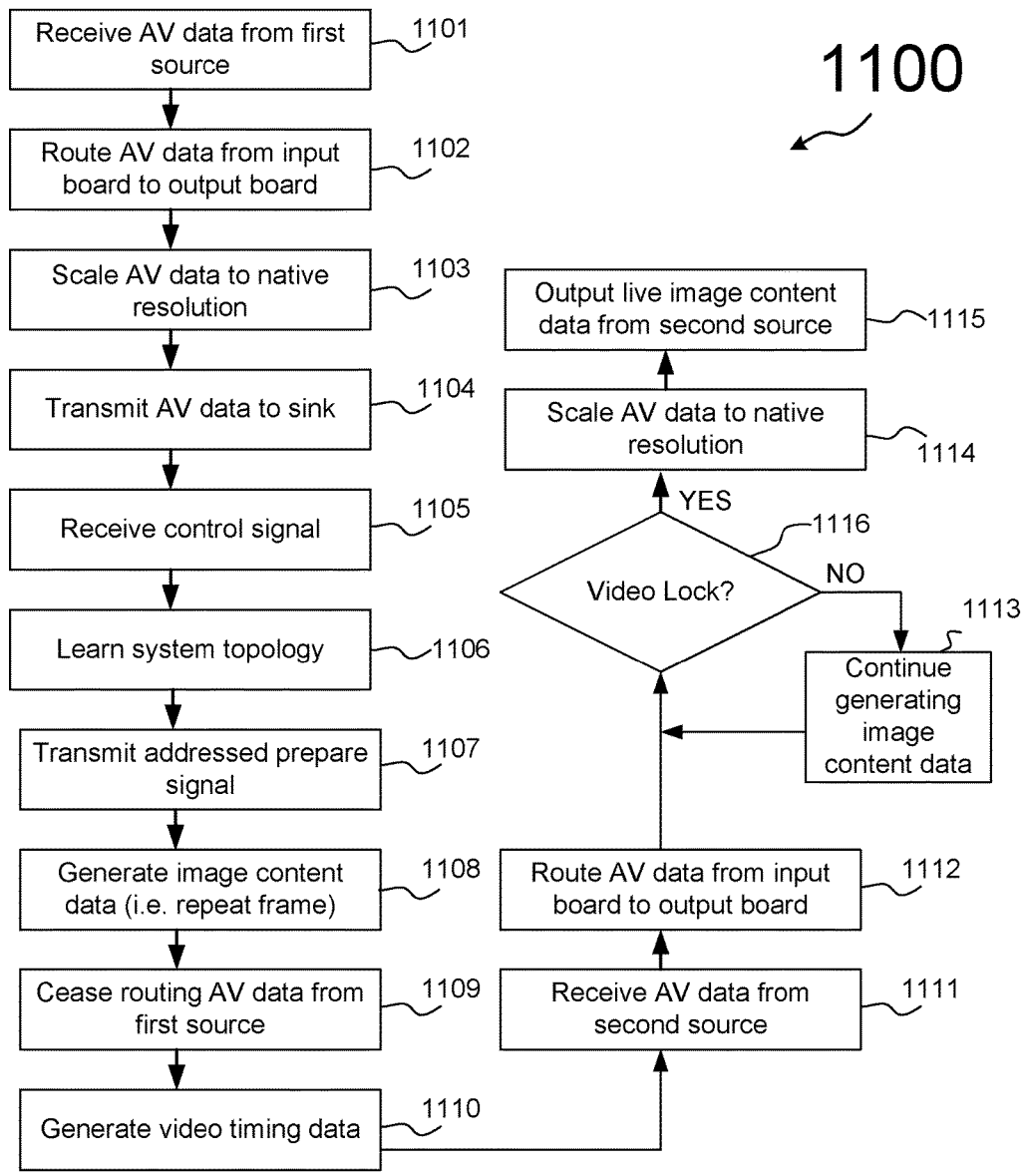
FIG. 11 is a flowchart illustrating steps in a method for reducing the switching time in a video distribution network, according to aspects of the embodiments.

FIG. 11 is a flowchart illustrating steps of method 1100 for reducing the switching time in a video distribution network 300, according to aspects of the embodiments.

In step 1101, switcher device 302 receives audiovisual data at a first input board via an AV link between a first video sink and the first input board.

In step 1102, the switcher device 302 routes audiovisual data from the first input board to an output board. The output board may be coupled via intermediate devices such as other switcher devices and output boards.

In step 1104, the output board transmits audiovisual data to a video sink over an AV link. According to aspects of the embodiments, the output board scales the audiovisual data received from the first input board to the native resolution of the video sink (step 1103) prior to transmitting to the video sink.

In step 1105, the processing unit 318 of the switcher device 302 receives a control signal to switch from routing audiovisual data from the first input board to the output board to routing audiovisual data from the second input board to the output board.

In step 1106, the switcher device processing unit 318 determines the path to the output board including an output of the switcher device 302 and a network address of the output board from a stored network topology. Using the above example, in regard to FIG. 10, to first switcher device 302a may determine that the path to an endpoint comprises a third output board of the switcher device.

In step 1107, the switcher device processing unit 318 transmits a prepare signal comprising the network address of the output board to the output board, indicating that there will be a switching event. The switcher device transmits the addressed prepare signal to the appropriate downstream node according to the topology.

In step 1108, the output board generates image content data, such as a repeating frame of video, in response to receiving the prepare signal from the switcher device processing unit 318. Upon receiving the prepare signal, the output scaler 402 may freeze on a frame of video by continuously outputting that frame.

The output scaler 402 outputs the generated image content data rather than the live image content data being routed to the output board from the multiplexer 306.

In step 1109, the multiplexer 306 ceases routing audiovisual data from the first input board.

In step 1110, the output board continues generating video timing data at a native resolution during the delay between receiving audiovisual data from the first input board and receiving audiovisual data from the second input board. By outputting a continuous stream of video timing data, the output board maintains the authenticity of the security link between the output board and the video sink.

In step 1111, the switcher device receives audiovisual data at a second input board via an AV link between a second video sink and the second input board.

In step 1112, the switcher device routes audiovisual data from the second input board to the output board.

Following step 1112 is decision step 1116. In decision step 1116, it is determined whether video lock has occurred. If video lock has occurred ("Yes" path from decision step 1116), method 1100 proceeds to step 1114. If video lock has not occurred ("No" path from decision step 1116), method 1100 proceeds to step 1113. In step 1113, the output board continues generating and outputting image content data (i.e. repeating frame of video) until video lock is achieved.

In step 1115, the output board transmits live image content data routed from the second input board to the video sink over an AV link. According to aspects of the embodiments, the output board scales the audiovisual data received from the first input board to the native resolution of the video sink (step 1114) prior to transmitting to the video sink.

The following is a pseudo-code representation of the operation in accordance with aspects of the embodiments.

Detect a user control signal to switch from a first video source to a second video source.

Determine network address of a desired output card.

Transmit a prepare signal comprising network address to a processing unit 403 of the desired output board in response to the detection of the user control signal.

Detect the prepare signal at the output board.

Instruct scaler to generate a repeated frame of image content data.

Cease routing audiovisual data from a first video source to the output board.

Continue generating video timing data at the scaler of the output board.

Begin routing audiovisual data from a second video source to the input board.

Cease generating image content data upon achieving video lock.

Figure 12:
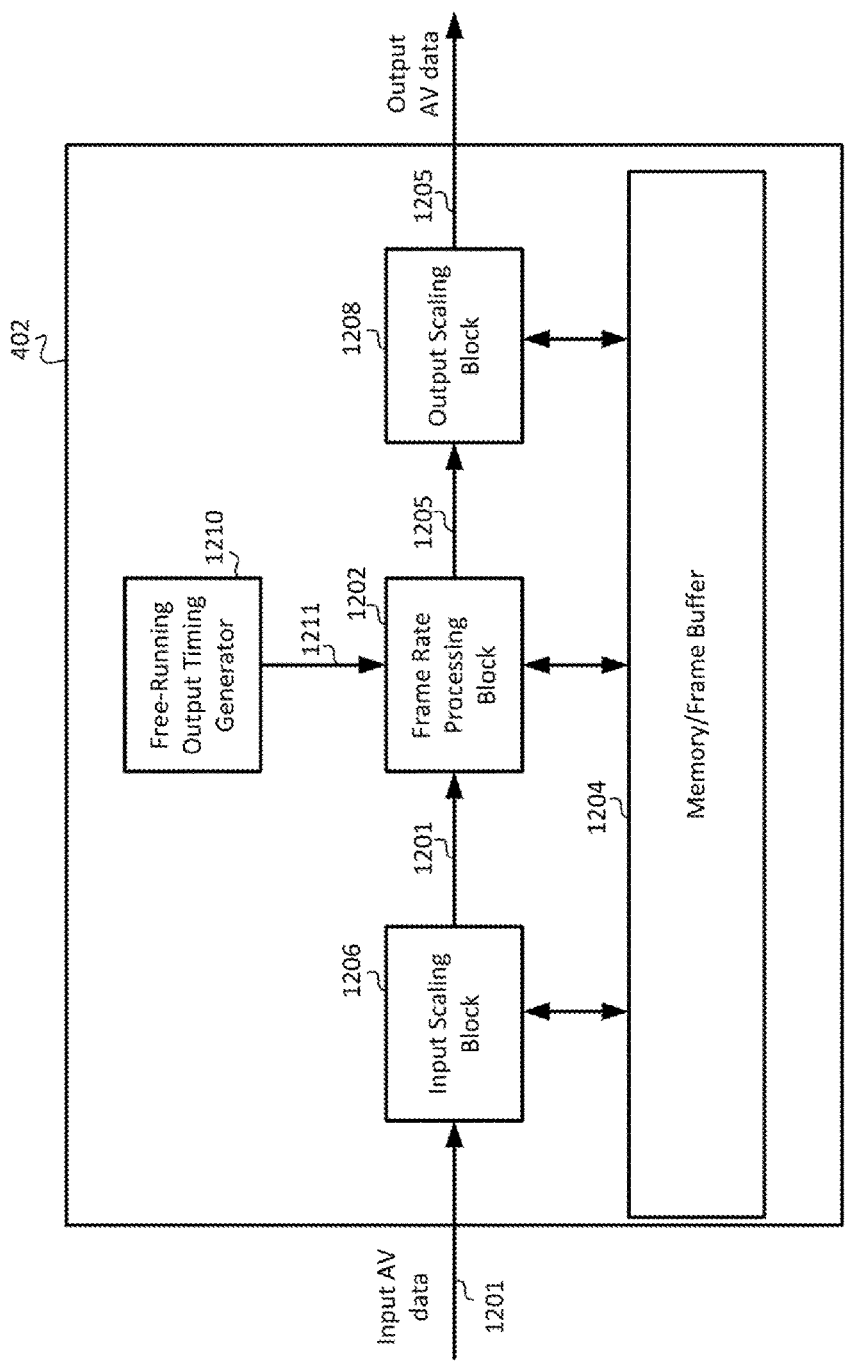
FIG. 12 is a block diagram of a scaler, according to aspects of the embodiments.

FIG. 12 shows a block diagram of the output scaler, according to aspects of the embodiments. The output scaler comprises a frame rate processing block 1202, a memory further comprising a frame buffer 1204, an input scaling block 1206 and an output scaling block 1208. According to aspects of the embodiments, the term block is synonymous with circuit.

The scaler receives input audiovisual data 1201 from the receiver comprising video timing data and image content data. The frame rate processing block is adapted to receive the asynchronous input video timing data 1201 and write the incoming image content data into memory 1204. The frame rate processing block 1202 is further adapted to receive the free-running output video timing data 1211 and read incoming video data from memory 1204 as required by the output resolution of the scaler 402 (i.e. native resolution of the video sink). The frame rate processing block 1202 is further adapted to perform frame rate conversion if the input refresh rate and the output refresh rate of the audiovisual data differ.

The input scaling block 1206 is adapted to receive the asynchronous input video timing data and perform scaling if required. In certain applications depending on the input and output setups, input scaling can be performed prior to frame rate processing according to aspects of the embodiments. According to further aspects of the embodiments, output scaling can be performed subsequent to frame rate processing. In these applications, the output scaling block 1208 receives the free running output video timing data and performs scaling if required.

The free running output timing generator 1210 is adapted to continuously generate free running output video timing data 1211 used to give the downstream video sink a fixed resolution.

According to aspects of the embodiments in which the output scaler 402 generates audiovisual data comprising a repeated frame of image content data, the last frame of video received by the output scaler 402 (i.e. the frame to be repeated), is repeatedly read from the memory and frame buffer and output by the output scaler 402. Upon the output scaler 402 achieving scaler lock with audiovisual data from the second source, a frame of image content data from audiovisual data received from the second source is read from the memory and frame buffer and output by the output scaler 402.

Any process descriptions or blocks in flow charts should be understood as representing modules, segments or portions of code that include one or more executable instructions for implementing specific logic functions or steps in the process. Alternate implementations are included within the scope of the aspects of the embodiments in which functions can be executed out of order from that shown or discussed, including substantial concurrence or reverse order, depending on the functionality involved, as would be understood by those of skill in the art. Also, steps disclosed as separate may be performed concurrently or combined, and a step shown as discrete may be performed as two or more steps. Furthermore, numerical values and disclosures of specific hardware are illustrative rather than limiting. Moreover, while the preferred embodiment has been disclosed in the context of HDMI, aspects of the embodiments can be implemented for use with another suitable interface that uses HDCP, such as DVI or any substantially HDMI-like interface. Therefore, aspects of the embodiments should be construed as limited by only the appended claims.

In this description, various functions and operations can be described as being performed by or caused by software code to simplify description. However, those skilled in the art will recognize what is meant by such expressions is that the functions result from execution of the code by a processor or processing unit, such as a microprocessor. Alternatively, or in combination, the functions and operations can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine of computer-readable media used to actually effect the distribution.

At least some aspects disclosed can be embodied, at least in part, in software. That is, the techniques may be carried out in a computer system or other data processing system in response to its processor/processing unit, such as a microprocessor, executing sequences of instructions contained in a memory, such as ROM, volatile RAM, non-volatile memory, cache or a remote storage device.

Routines executed to implement the embodiments can be implemented as part of an operating system, middleware, service delivery platform, software development kit (SDK) component, web services, or other specific application, component, program, object, module or sequence of instructions referred to as "computer programs". Invocation interfaces to these routines can be exposed to a software development community as an application programming interface (API). The computer programs typically comprise one or more instructions set at various times in various memory and storage devices in a computer, and that, when read and executed by one or more processors/processing units in a computer, cause the computer to perform operations necessary to execute elements involving the various aspects.

A machine readable medium can be used to store software and data which when executed by a data processing system causes the system to perform various methods. The executable software and data can be stored in various places, including for example ROM, volatile RAM, non-volatile memory and/or cache. Portions of this software and/or data can be stored in any of these storage devices. Further, the data and instructions can be obtained from centralized servers or peer to peer networks. Different portions of the data and instructions can be obtained from different centralized servers and/or peer-to-peer networks. Different portions of the data and instructions can be obtained from different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include, but are not limited to, recordable and non-recordable type media, such as volatile and non-volatile memory devices, read-only memory (ROM), random access memory (RAM), flash memory devices, floppy and other removable disks, magnetic disk storage media, optical storage media (e.g. compact disc read-only memory (CD ROM), digital versatile discs (DVDs), etc.) among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e. stores and/or transmits) information in a form accessible by a machine (e.g. a computer, network device, personal digital assistant, manufacturing tool, any device with a set of one or more processors, etc.).

In various embodiments, hardwired circuitry can be used in combination with software instructions to implement the techniques. Thus, the techniques are neither limited to any specific combination or hardware circuitry and software nor to any particular source for the instructions executed by the data processing system.

Although some of the drawings illustrate a number of operations in a particular order, operations that are not order dependent can be reordered and other operations can be combined, or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although aspects of the embodiments have been described herein with reference to the accompanying drawings, it is to be understood that the aspects of the embodiments are not limited to those precise embodiments, and that various other changes and modifications may be made therein by one skilled in the art without departing from the scope of the appended claims.

INDUSTRIAL APPLICABILITY

To solve the aforementioned problems, aspects of the embodiments are directed towards a unique device in which an output board with an output scaler 402 minimizes switching delay in a video distribution network by outputting a continuous stream of audiovisual data during switching events.

Alternate Embodiments

Alternate embodiments may be devised without departing from the spirit or the scope of the aspects of the embodiments. For example, during switching events, the output scaler can generate video information such that a switching graphic will be displayed on the screen or a color other than black.

We claim:

1. A switcher device comprising:
at least one output board;
at least two input boards, each of the at least two input boards adapted to receive audiovisual data from a respective audiovisual source via a respective audiovisual link;
a multiplexer communicatively coupled between the at least two input boards and the at least one output board, and adapted to dynamically switch audiovisual data from the at least two input boards to the at least one output board; and
a switcher device processing unit adapted to notify the at least one output board that it will receive an output from the multiplexer a predetermined amount of time prior to transmitting a switch signal to the multiplexer for a switching event, and wherein the at least one output board comprises
an output board processing unit, and wherein
the switcher device processing unit is further adapted to transmit a prepare signal to the output board processing unit a predetermined amount of time before transmitting a switch signal to the multiplexer for the switching event, and wherein
the at least one output board is adapted to
(i) transmit audiovisual data to an audiovisual sink via an audiovisual link,
(ii) generate audiovisual data comprising a repeated frame of image content data, and
(iii) output a substantially continuous stream of audiovisual data during the switching event, the audiovisual data comprising the repeated frame of image content data, and wherein
the at least one output board further comprises
a scaler adapted to generate the repeated frame of image content data during the switching event, and wherein the at least one output board is adapted to
transmit audiovisual data to the audiovisual sink via a security protocol link, and is further adapted to maintain the security protocol link as an authenticated interface by generating a continuous stream of video timing data during the switching event.

2. The switcher device according to claim 1, wherein the switching event comprises:
a switch from receiving audiovisual data from a first audiovisual source to receiving audiovisual data from a second audiovisual source.

3. The switcher device according to claim 1, wherein the switching event comprises:
a switch from receiving audiovisual data at a first resolution to receiving audiovisual data at a second resolution.

4. The switcher device according to claim 1, wherein the switching event comprises:
a switch from receiving audiovisual data at a first refresh rate to receiving audiovisual data at a second refresh rate.

5. The switcher device according to claim 1, wherein the prepare signal comprises:
a network address of the at least output board.

6. The switcher device according to claim 1, wherein the prepare signal is transmitted as a user datagram protocol packet.

7. The switcher device according to claim 1, wherein the scaler is further adapted to
substantially continuously output the repeated frame of image content data until receiving a sufficient amount of audiovisual data after the switching event to achieve video lock.

8. The switcher device according to claim 1, wherein the scaler is further adapted to
determine the native resolution of the audiovisual sink from Extended Display Identification Data (EDID) information of the audiovisual sink.

9. The switcher device according to claim 1, wherein the security protocol link is a High-bandwidth Digital Content Protection (HDCP) link.

10. The switcher device according to claim 1, wherein the scaler is further adapted to
generate the substantially continuous stream of video timing data at a native resolution of the audiovisual sink.

11. A video distribution network comprising:
at least two audiovisual sources;
at least one output board;
a multiplexer communicatively coupled to both the at least two audiovisual sources and the at least one output board;
a switcher adapted to
dynamically route audiovisual data from the at least two audiovisual sources to the at least one output board through the multiplexer, and is further adapted to
notify the at least one output board that it will receive an output from the multiplexer a predetermined amount of time prior to transmitting a switch signal to the multiplexer for a switching event; and
at least one audiovisual sink, and wherein the at least one output board is adapted to—
be communicatively coupled to the at least one audiovisual sink,
transmit audiovisual data to the at least one audiovisual sink via an audiovisual link,
receive the notification from the switcher,
generate audiovisual data comprising a repeated frame of image content data in response to the notification, and
output a substantially continuous stream of audiovisual data during the switching event, the audiovisual data comprising the repeated frame of image content data, and wherein the at least one output board comprises—
a scaler adapted to generate the repeated frame of image content data during the switching event, and wherein the at least one output board is further adapted to
transmit audiovisual data to the at least one audiovisual sink via a security protocol link, and is further adapted to
maintain the security protocol link as an authenticated interface by generating a substantially continuous stream of video timing data during the switching event.

12. The switcher device according to claim 11, wherein the switching event can be one of a switch from receiving audiovisual data from a first audiovisual source to receiving audiovisual data from a second audiovisual source, a switch from receiving audiovisual data at a first resolution to receiving audiovisual data at a second resolution, and a switch from receiving audiovisual data at a first refresh rate to receiving audiovisual data at a second refresh rate.

13. The video distribution network according to claim 11, wherein
the switcher comprises a switcher device processing unit, and
the at least one output board comprises an output board processing unit, and wherein
the switcher device processing unit is adapted to
be communicatively coupled with the multiplexer and the output device processing unit, and
the switcher device processing unit is further adapted to
transmit a prepare signal to the at least one output board processing unit a predetermined amount of time before transmitting a switch signal to the multiplexer for the switching event.

14. The video distribution network according to claim 13, wherein the prepare signal comprises:
a network address of the at least one output board.

15. The video distribution network according to claim 13, wherein
the switcher device processing unit and the output device processing unit are communicatively coupled via an Ethernet interface.

16. The video distribution network according to claim 13, wherein the prepare signal is transmitted as a user datagram protocol packet.

17. The video distribution network according to claim 11, wherein the switcher is further adapted to
determine a network topology of the video distribution network.

18. An output board in a switcher device for transmitting audiovisual data to a video sink, the output board comprising:
an output board processing unit; and
a scaler adapted to generate video timing data at a native resolution of the video sink and a repeated frame of image content data during a switching event, wherein the switcher device comprises
a switcher device processing unit, and a multiplexer, and wherein
- (a) the switcher device processing unit is communicatively coupled with the multiplexer and the output board processing unit, and
- (b) the switcher device processing unit is adapted to notify the output board processing unit that it the output board will receive an output from the multiplexer a predetermined amount of time prior to transmitting a switch signal the multiplexer for the switching event, wherein the at least one output board is adapted to
- (i) transmit audiovisual data to an audiovisual sink via an audiovisual link,
- (ii) generate audiovisual data comprising a repeated frame of image content data, and
- (iii) output a substantially continuous stream of audiovisual data during the switching event, the audiovisual data comprising the repeated frame of image content data, and wherein the at least one output board is adapted to transmit audiovisual data to the audiovisual sink via a security protocol link, and is further adapted to maintain the security protocol link as an authenticated interface by generating a continuous stream of video timing data during the switching event.

19. The output board for a switcher device according to claim 18, wherein the switcher device processing unit is adapted to transmit a prepare signal to the output board processing unit a predetermined amount of time before transmitting a switch signal to the multiplexer for the switching event.

20. The output board of claim 18, wherein the switching event is a switch from receiving audiovisual data at a first resolution to receiving audiovisual data at a second resolution.

21. The output board of claim 18, wherein
the switching event is a switch from receiving audiovisual data from a first source to receiving audiovisual data from a second source.

22. The output board of claim 18, wherein
the switching event is a switch from receiving audiovisual data at a first refresh rate to receiving audiovisual data at a second refresh rate.

23. The output board of claim 18, wherein
the scaler is adapted for continuing to output the repeated frame of image content data until receiving a sufficient amount of audiovisual data after the switching event to achieve video lock.

24. The output board of claim 18, wherein
the scaler is adapted to determine a native resolution of the video sink from Extended Display Identification Data (EDID) information of the video sink.

* * * * *